(12) United States Patent
Alexander et al.

(10) Patent No.: US 12,481,293 B2
(45) Date of Patent: Nov. 25, 2025

(54) AUTONOMOUS VEHICLE HOSTED DISTRIBUTION SERVICE

(71) Applicant: Applied Electric Vehicles Ltd, Scoresby (AU)

(72) Inventors: Marc Alexander, Croydon Hills (AU); Aleks Witko, Mont Albert (AU)

(73) Assignee: Applied Electric Vehicles Ltd, Scoresby (AU)

( * ) Notice: Subject to any disclaimer, the term of this patent is extended or adjusted under 35 U.S.C. 154(b) by 2 days.

(21) Appl. No.: 18/607,041

(22) Filed: Mar. 15, 2024

(65) Prior Publication Data
US 2025/0291350 A1    Sep. 18, 2025

(51) Int. Cl.
| | | |
|---|---|---|
| *G05D 1/43* | (2024.01) | |
| *B60W 30/06* | (2006.01) | |
| *G06Q 10/087* | (2023.01) | |
| *G06Q 30/06* | (2023.01) | |
| *G07C 9/10* | (2020.01) | |
| *G07C 9/32* | (2020.01) | |

(52) U.S. Cl.
CPC .............. *G05D 1/43* (2024.01); *B60W 30/06* (2013.01); *G06Q 10/087* (2013.01); *G06Q 30/06* (2013.01); *G07C 9/10* (2020.01); *G07C 9/32* (2020.01)

(58) Field of Classification Search
CPC .. G05D 1/43; G07C 9/10; G07C 9/32; B60W 30/06; G06Q 10/087; G06Q 30/06
See application file for complete search history.

(56) References Cited

U.S. PATENT DOCUMENTS

| | | | |
|---|---|---|---|
| 10,332,065 B2 * | 6/2019 | Ferguson | G06Q 20/127 |
| 10,613,533 B1 | 4/2020 | Payson et al. | |
| 11,794,783 B2 * | 10/2023 | Brown | H04W 4/021 |
| 2003/0217002 A1 * | 11/2003 | Enborg | G06Q 20/105 |
| | | | 705/41 |
| 2018/0204267 A1 | 7/2018 | Licht et al. | |
| 2019/0043001 A1 | 2/2019 | Woulfe et al. | |
| 2019/0049988 A1 * | 2/2019 | Meij | G06Q 50/12 |
| 2019/0236961 A1 * | 8/2019 | Kaneko | G08G 1/22 |

(Continued)

FOREIGN PATENT DOCUMENTS

WO    2025194071 A1    9/2025

OTHER PUBLICATIONS

"International Search Report and Written Opinion", International Application No. PCT/US25/19985, Jun. 24, 2025, 9 pages.

*Primary Examiner* — Ramsey Refai
(74) *Attorney, Agent, or Firm* — FIG. 1 Patents

(57) ABSTRACT

Autonomous vehicle hosted distribution services are described. In one or more implementations, a system is configured to control an autonomous vehicle to perform a parking maneuver at a host site associated with a user, authenticate an identity of the user for authorizing access to an inventory of items when the user approaches the vehicle, and use machine-learning to determine an item that the user is predicted to remove from the inventory. The system is further configured to automatically open a door on the vehicle to reveal a location of the item for allowing the item to be removed from the inventory, detect the user retreating from the vehicle after removing the item from the vehicle, and responsive to detecting the user retreating from the vehicle, automatically close the door to secure the inventory on the vehicle.

20 Claims, 8 Drawing Sheets

(56) References Cited

U.S. PATENT DOCUMENTS

2019/0283252 A1    9/2019  Skaaksrud et al.
2020/0355507 A1*  11/2020  Shitara ................ G06Q 10/087
2021/0256466 A1    8/2021  Javidan et al.

* cited by examiner

300

AUTONOMOUS VEHICLE HOSTED DISTRIBUTION SERVICE

BACKGROUND

Many people regularly travel to shopping centers and other places outside their neighborhoods or place of business to purchase items or run errands to fulfill their daily needs. Driving to these places may waste time and energy dealing with traffic congestion and unavailable parking. Even though many goods are available from online merchants for home delivery, their deliveries are not immediate. Consumers carefully plan their online orders to ensure goods arrive ahead of time. Even then, deliveries may occur when people are not home. Packages left unattended (e.g., outside on a porch of a residence) are susceptible to damage (e.g., from extreme weather) or even theft. These and many other shopping issues can detract from peoples' productivity and interfere with enjoyment in other areas of their lives.

DETAILED DESCRIPTION

Figure 1:
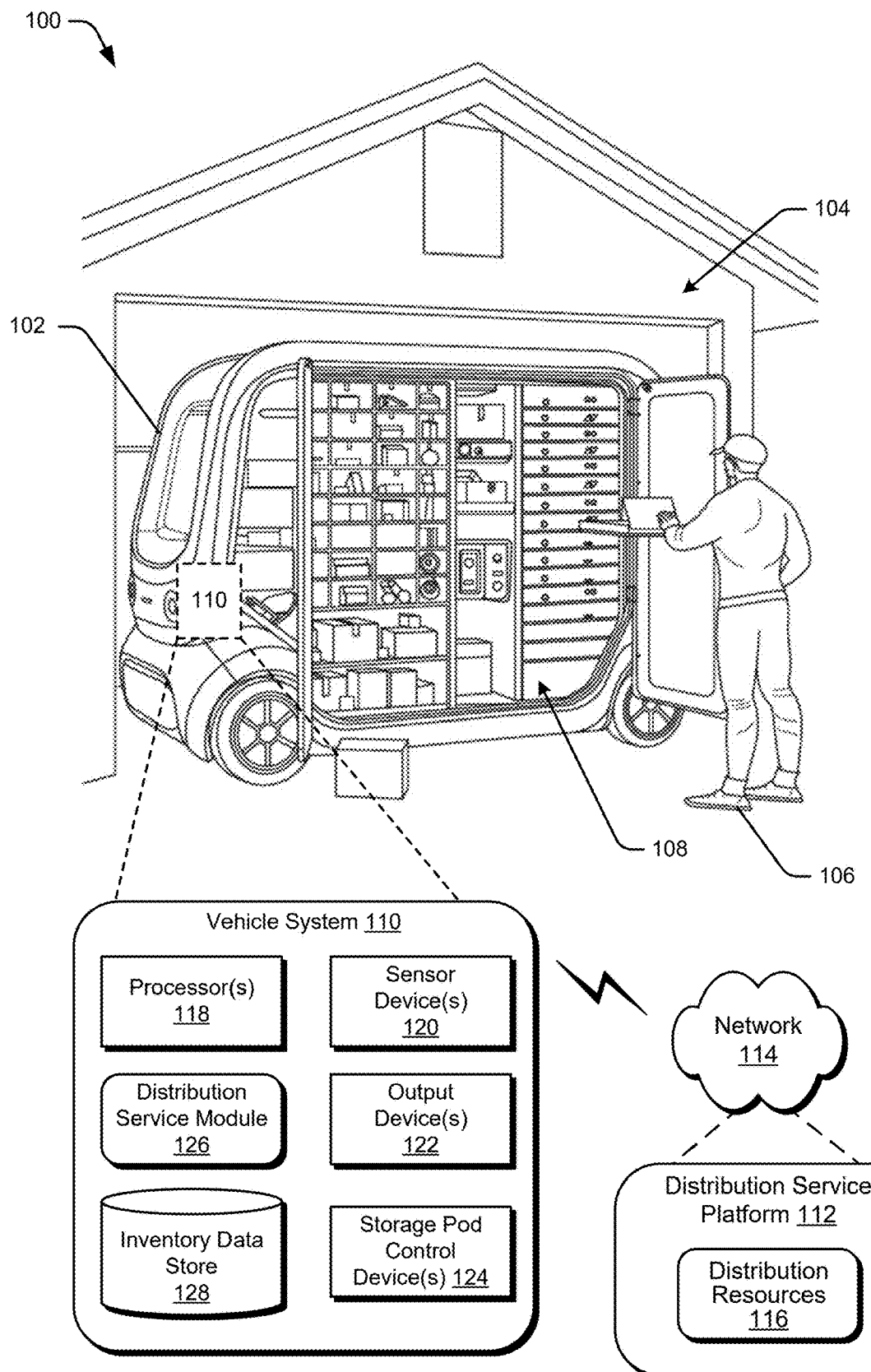
FIG. 1 is a block diagram of a non-limiting example environment supported by an autonomous vehicle hosted distribution service.

Many people regularly travel to shopping centers and other places outside their neighborhoods to purchase items or run errands to fulfill their daily needs. When many people rely on personal vehicles to go shopping, traffic congestion increases, particularly during popular shopping hours. Traffic congestion contributes to increased travel times and fuel consumption, and also leads to higher levels of air pollution, which can have detrimental effects on public health and the environment.

Another issue caused by modern shopping habits is the inefficient use of time. Shopping often involves driving to multiple places, seeking available parking, searching for items, waiting in checkout lines, and commuting back home, which can be stressful. The time consumed shopping may interfere with opportunities other more productive or enjoyable activities. Prolonged shopping experiences may be exacerbated in congested urban environments where travel times are unpredictable and often prolonged.

Even though many goods are available from online merchants for home delivery, their deliveries are not immediate. Consumers carefully plan their online orders to ensure goods arrive ahead of time. Even then, deliveries are often made when people are not home. Packages left unattended (e.g., outside on a porch of a residence) are susceptible to damage (e.g., from extreme weather) or theft. In addition, their packaging material contributes to increased waste production. Furthermore, an increase in popularity of online shopping causes a surge in delivery vehicles on roadways, contributing to further traffic congestion, vehicle emissions, and road noise.

These and many other shopping issues can detract from peoples' productivity and interfere with enjoyment in other areas of their lives. These issues do not just affect the individuals involved but also have broader implications for the urban environment and society as a whole. In light of these problems, innovative solutions are needed to streamline the shopping process, reduce the reliance on personal vehicles and delivery services, and promote more sustainable and efficient practices in urban environments.

In accordance with techniques of this disclosure, an autonomous vehicle hosted distribution service is described. For example, imagine people at a residence or place of business have an autonomous vehicle parked (e.g., in a garage, in a driveway, in a carport, in an alley, in a parking lot) at a host site (e.g., a residence, an apartment complex, a business, a government or military installation, a school). The vehicle may be a personal vehicle (e.g., owned, borrowed, leased) or a shared vehicle utilized by multiple residences or businesses located near the host site.

In at least one example, the vehicle has a passenger compartment to transport occupants. In at least one other example, the vehicle is configured for transporting cargo and does not include a passenger compartment. Nevertheless, a main purpose of the vehicle is to implement a vehicle hosted distribution service for the exclusive enjoyment of residents or employees at the host site.

The vehicle acts as a last mile, or end point, aggregator for a range of items and services that are seemingly always available for consumption at the host site. For example, the vehicle is operable to maintain an inventory of merchandise or other items at the host site (e.g., their homes, their work locations), which users consume on a regular basis. Users at the host site may access various goods and services made available from the vehicle for immediate purchase and consumption. In implementing the vehicle hosted distribution service, the vehicle functions like a general store or extension of a kitchen pantry, a workshop, a supply room, etc. Unless the vehicle travels from the host site (e.g., to replenish its inventory, to perform other tasks), the vehicle may remain stationed at the host site to provide access to the vehicle hosted distribution service throughout the day.

To manage the inventory of items on board, the vehicle includes one or more storage compartments, or so called storage pods stocked with everyday consumables. For example, a refrigerator storage pod maintains an inventory of groceries, beverages, medical supplies, or other perishable items, which are used at the host site for preparing meals and the like. Another storage pod may include non-perishable items, such as toiletries, paper towels, bandages, and cleaning supplies, to help users perform daily chores or routines. When a vehicle serves a business, one or more storage pods may be filled with materials, tools, and equipment, which employees of the business use to perform jobs. For example, a vehicle that hosts a distribution service at a mining or construction site keeps power tools, hand tools, protective equipment, tool consumables, and other items on hand so workers do not need to leave a jobsite.

In at least one implementation, the vehicle is configured to allow users at the host site to purchase items from the inventory by simply removing the items from the storage compartments. For example, sensors on the vehicle are configured to authenticate users approaching the vehicle and automatically identify items they remove to provide a seamless shopping experience. Rather than drive to a neighborhood market or shop, users can walk to their garage and physically browse their personal vehicle pantry to obtain the items they need without wasting time in traffic. Workers can remain productive by visiting a vehicle location to acquire items for their jobs, without driving off-site (e.g., to a hardware store) or waiting for an online delivery.

In one or more examples, the vehicle enables both inbound and outbound transfers of goods. For example, the vehicle includes a logistics or postal storage pod for handling inbound and outbound exchanges of mail, packages, or other items being delivered to and from the host site. Users can ship items without having to worry about logistics, such as determining correct postage fees, or transporting packages to post offices or parcel distribution locations. Users can receive items when convenient to visit the vehicle, where inbound items are stored securely and, in a climate-controlled manner. Similar to making purchases of items from the vehicle, a user can merely place a package for sending into the postal pod, and the vehicle delivers the package or drops the package off with a long-haul distributor. When receiving a package, the vehicle sensors automatically recognize the user approaching the vehicle as the intended recipient and automatically opens a cargo door to let the user take delivery.

The vehicle is configured to automatically leave the host site to replenish items or run errands requested by the users (e.g., pick up orders, deliver packages). These types of events can occur at times when an absence of the vehicle is not likely to be noticed by the users. For example, the vehicle leaves a user's garage at 3 AM to deliver items or stock up on groceries and other items. This way, the vehicle inventory is automatically replenished, and the vehicle hosted distribution service is seemingly always available at the host site to serve the users.

In this way, users of the vehicle hosted distribution service can spend less time involved with shopping issues that otherwise detract from peoples' productivity and interfere with enjoyment of their lives. The vehicle hosted distribution service may reduce traffic, cut down on vehicle emissions, and provide other benefits to users and society as a whole. The vehicle hosted distribution service may streamline the shopping process, reduce the reliance on personal vehicles and delivery services, and promote more sustainable and efficient practices in communities.

In some aspects, the techniques described herein relate to a method for implementing a vehicle hosted distribution service, the method including: controlling, by a processing device, an autonomous vehicle to perform a parking maneuver at a host site associated with a user, responsive to detecting the user approaching the autonomous vehicle, authenticating, by the processing device, an identity of the user for authorizing access to an inventory of items loaded on the vehicle, responsive to detecting the user removing at least one item from the vehicle, updating, by the processing device, the inventory to omit the at least one item, controlling, by the processing device, the autonomous vehicle to leave the host site and drive to a distribution center for replenishing the inventory with a second instance of the at least one item removed from the vehicle and omitted from the inventory, and responsive to updating the inventory to include the second instance of the at least one item, controlling, by the processing device, the autonomous vehicle to return to the host site with the second instance of the at least one item included in the inventory.

In some aspects, the techniques described herein relate to a method, wherein the inventory of items are loaded in one or more storage pods on the vehicle, the method further including: responsive to authenticating the identity of the user, controlling, by the processing device, an access panel into the storage pods to open and provide the access to the inventory of items loaded on the vehicle.

In some aspects, the techniques described herein relate to a method, further including: responsive to detecting the user retreating from the autonomous vehicle, controlling, by the processing device, the access panel to close and secure the inventory of items loaded on the vehicle.

In some aspects, the techniques described herein relate to a method, wherein the user includes a first user, the method further including: responsive to detecting a second user approaching the autonomous vehicle, refraining, by the processing device, from authorizing access to the inventory of items when the processing device fails to authenticate an identity of the second user.

In some aspects, the techniques described herein relate to a method, wherein controlling the autonomous vehicle to leave the host site and drive to the distribution center includes: determining, by the processing device, a time of day when an absence of the vehicle from the host site does not inconvenience the user, wherein controlling the autonomous vehicle to leave the host site and drive to the distribution center occurs during the time of day when the absence of the vehicle from the host site does not inconvenience the user.

In some aspects, the techniques described herein relate to a method, further including: further responsive to detecting the user removing the at least one item from the vehicle, executing, by the processing device, a commercial transaction to purchase the at least one item on behalf of the user.

In some aspects, the techniques described herein relate to a method, wherein the inventory of items loaded on the vehicle include at least one of medicine, medical supplies, or medical equipment, the method further including: receiving, by the processing device, an alert from an emergency response service requesting the medicine, the medical supplies, or the medical equipment to be delivered to an emergency location, and controlling, by the processing device, the autonomous vehicle to leave the host site and drive to the emergency location for delivering the medicine, the medical supplies, or the medical equipment in response to the alert.

In some aspects, the techniques described herein relate to a system including: one or more sensor devices configured to generate sensor data indicative of an environment inside or outside an autonomous vehicle, one or more removable storage pods configured to store an inventory of items loaded on the autonomous vehicle, and at least one processing device configured to: control, based on the sensor data, the autonomous vehicle to perform a parking maneuver at a host site associated with a user, authenticate, based on the sensor data, an identity of the user for authorizing access to the inventory of items in response to detecting the user approaching the autonomous vehicle, use machine-learning to determine, based on previous interactions between the autonomous vehicle and the user, at least one item that the user is predicted to remove from the inventory, automatically open a door on the autonomous vehicle to reveal a location of the at least one item within the removable storage pods for allowing the item to be removed from the inventory, detect, based on the sensor data, the user retreating from the autonomous vehicle after removing the at least one item from the vehicle, and responsive to detecting the user retreating from the autonomous vehicle, automatically close the door to secure the inventory on the autonomous vehicle.

In some aspects, the techniques described herein relate to a system, wherein the at least one processing device is further configured to: control the autonomous vehicle to leave the host site and drive to a remote location for replenishing the inventory with a second instance of the at least one item removed from the vehicle, control the autonomous vehicle to obtain the second instance of the at least one item from a removable storage pod of another autonomous vehicle parked at the remote location, and responsive to updating the inventory to include the second instance of the at least one item, control the autonomous vehicle to return to the host site with the second instance of the at least one item included in the inventory.

In some aspects, the techniques described herein relate to a system, wherein the at least one processing device is further configured to: use machine-learning to determine, based on an online presence of the user, one or more other items that the user is predicted to use at the host site, control the autonomous vehicle to leave the host site and drive to a distribution center for adding the one or more other items to the inventory, and responsive to updating the inventory to include the one or more other items, control the autonomous vehicle to return to the host site with the one or more other items.

In some aspects, the techniques described herein relate to a system, further including: one or more output devices configured to produce audible, visual, or haptic signals of a user interface to indicate a menu of the inventory of items loaded on the autonomous vehicle and other inventories of items loaded on other autonomous vehicles parked in a vicinity of the host site.

In some aspects, the techniques described herein relate to a system, wherein: at least one of the removable storage pods is configured to dispense medicine from the inventory, and the at least one item includes the medicine.

In some aspects, the techniques described herein relate to a system, wherein: the user is a first user, the host site includes a first residence of the first user and a second residence of a second user, a first subset of the removable storage pods include a first subset of the inventory including a first subset of the items reserved for the first user, and a different subset of the removable storage pods include a different subset of the inventory including a different subset of the items reserved for the second user.

In some aspects, the techniques described herein relate to a computer-readable storage medium including instructions that, when executed, cause at least one processing device to: control an autonomous vehicle to perform a parking maneuver at a host site associated with a user, responsive to detecting the user approaching the autonomous vehicle, authenticate an identity of the user for authorizing access to an inventory of items loaded on the vehicle, responsive to detecting the user loading at least one item to the vehicle, update the inventory to include the at least one item, control the autonomous vehicle to leave the host site and drive to a delivery location for the at least one item loaded on the vehicle and included in the inventory, and responsive to updating the inventory to omit the at least one item from the inventory, control the autonomous vehicle to return to the host site having delivered the at least one item at the delivery location.

In some aspects, the techniques described herein relate to a computer-readable storage medium, wherein the at least one item includes at least one of a package, a letter, or an envelope, and the delivery location includes a private or public shipment distribution center.

In some aspects, the techniques described herein relate to a computer-readable storage medium, wherein the instructions further cause the at least one processing device to: determine whether the at least one item loaded on the vehicle is a time-sensitive delivery, when the at least one item loaded on the vehicle is a time-sensitive delivery, control the autonomous vehicle to immediately leave the host site and drive to the delivery location, and when the at least one item loaded on the vehicle is not a time-sensitive delivery, control the autonomous vehicle to leave the host site and drive to the delivery location during a time of day when an absence of the vehicle from the host site does not inconvenience the user.

In some aspects, the techniques described herein relate to a computer-readable storage medium, wherein the at least one item includes an outbound shipment, and the instructions further cause the at least one processing device to: responsive to detecting an inbound shipment being loaded on the vehicle at the private or public shipment distribution center, update the inventory to include the inbound shipment, responsive to updating the inventory to include the inbound shipment to the inventory, control the autonomous vehicle to return to the host site having delivered the outbound shipment at the private or public shipment distribution center, responsive to detecting the user approaching the autonomous vehicle, authenticate the identity of the user for authorizing access to the inbound shipment, and responsive to detecting the user removing the inbound shipment from the vehicle, update the inventory to omit the inbound shipment.

In some aspects, the techniques described herein relate to a computer-readable storage medium, wherein the at least one item includes at least one of trash, waste, or recyclables, and the delivery location includes a waste processing center.

In some aspects, the techniques described herein relate to a computer-readable storage medium, wherein the computer-readable storage medium is installed in the autonomous vehicle.

In some aspects, the techniques described herein relate to a computer-readable storage medium, wherein the computer-readable storage medium is installed in a remote computing system communicatively coupled to the autonomous vehicle.

FIG. 1 is a block diagram of a non-limiting example environment 100 supported by an autonomous vehicle hosted distribution service. The environment 100 includes an autonomous vehicle 102 that is parked at a host site 104.

The host site 104 represents any setting where the vehicle 102 may park, such as a side of roadway, a driveway, a garage, a carport, a parking lot, an off road area (e.g., a construction site, a mining operation, a recreational area), to name a few, including public or private spaces. In particular, the host site 104 is in a place that provides convenient access to a user 106. For example, the host site 104 is a driveway, alley, garage, shed, carport, lot, yard, or any other location within a short walking distance to a residential property (e.g., a house, an apartment) where the user 106 lives. In another example, the host site 104 is near a non-residential property (e.g., business, construction or mining site, school, place of worship) where the user 106 works or spends their day.

The vehicle 102 may be any type of autonomous vehicle including ground vehicles (e.g., trucks, cars, vans, tractor-trailers, tanks), air vehicles, rail vehicles, marine vehicles, space vehicles, or other vehicle types. The vehicle 102 in at least one example is completely unmanned (e.g., autonomously controlled, remotely controlled). In at least one other example, the vehicle 102 is at least partially controlled by manual inputs (e.g., semi-autonomously controlled, at least partially operated by the user 106). In at least one example, the vehicle 102 includes a passenger compartment and is operable to transport occupants. In at least one other example, the vehicle 102 is configured for transporting cargo alone, and does not include a passenger compartment. Nevertheless, a main purpose of the vehicle 102 is to implement a vehicle hosted distribution service for the exclusive enjoyment of the user 106 (e.g., residents, employees) at the host site 104.

The vehicle 102 may be stationed at the host site 104 in exchange for the user 106 agreeing to participate in a distribution service hosted by the vehicle 102. For example, as part of the vehicle distribution service, the vehicle 102 provides the user 106 with access to merchandise and services that may be consumed by the user 106, while living or working at the host site 104. The vehicle 102 is configured as a last mile or end point aggregator for a range of items and services that help the user 106 stay busy to complete their work or daily tasks. The user 106 may own the vehicle 102, or the vehicle 102 may be borrowed or leased to the user 106, in exchange for their participation in the distribution service.

The vehicle 102 includes one or more storage pods 108. The storage pods 108 are compartments, bays, drawers, shelves, containers, or other partially enclosed or fully enclosed portion of the vehicle 102 that is used to facilitate the exchange of items or performance of services. As one example, the storage pods 108 include a waste disposal pod where the user 106 disposes trash and recyclables. The storage pods 108 can include refrigerated compartments for preserving perishable items (e.g., groceries, medicines, flowers, beverages). The storage pods 108 may include non-refrigerated bays that contain non-perishable items (e.g., paper products, non-perishable food items, materials, supplies). In one or more examples, the storage pods 108 are configured as tool chests for hand tools, power tools, building materials, and the like. In at least one example, the storage pods 108 include a logistics pod for handling inbound and outbound delivery of mail, packages, and other deliverable items. Many other possible types of the storage pods 108 exist, which is evident from the additional examples and further descriptions of the other drawings that accompany this disclosure.

To implement the vehicle hosted distribution service, the vehicle 102 relies on various components of a vehicle system 110. The vehicle system 110 generally includes multiple electronic systems configured to interface with electro-mechanical components of the vehicle 102 to implement processor-based vehicle functions and processor-driven operations, such as for driving or maneuvering the vehicle 102 in the environment 100, providing access to items or services associated with the storage pods 108, and the like. For example, the electronic components of the vehicle system 110 configure the vehicle 102 to automate functions in furtherance of implementing the vehicle hosted distribution service. As one example, the vehicle system 110 controls access to the storage pods 108 to allow the user 106 to securely retrieve and/or purchase items at the host site 104, as if the vehicle 102 is a personal store or extension of their kitchen pantry, workshop, toolbox, or supply closet. The vehicle system 110 includes one or more processors 118, one or more sensor devices 120, one or more output devices 122, one or more storage pod control devices 124, a distribution service module 126, and an inventory data store 128.

In one or more examples, the vehicle 102 implements the vehicle hosted distribution service at the host site 104 by relying almost entirely on the vehicle system 110. For example, the vehicle system 110 implements the distribution service without communicating with external devices. In at least one other example, the vehicle system 110 is aided by a distribution service platform 112 executing on a remote computing system, which shares a connection to the vehicle 102 over a network 114. For example, the distribution service platform 112 executes on one or more remote servers to enhance the functionality of the vehicle system 110. The vehicle system 110 may communicate through the network 114 to offload data or tasks to be handled by the distribution service platform 112. Upon receiving the data or requests from the vehicle system 110, one or more distribution resources 116 of the distribution service platform 112 are configured to remotely process the data or remotely perform the tasks on behalf of the vehicle 102. Examples of the distribution resources 116 include external databases, application program interfaces (APIs), external processors, cloud platforms, Internet of Things (IoT) devices, computer-readable storage devices, other vehicles, and the like.

In at least one example, the processors 118 are electronic circuits that process instructions for executing functions on the vehicle 102. Execution of the functions enables the processors 118 to implement vehicle operations for achieving smooth and safe driving by the vehicle 102 and for facilitating safe human interactions with the vehicle hosted distribution services provided by vehicle 102. The processors 118 are also referred to as processing devices, some examples of which include but are not limited to a central processing unit (CPU), a graphics processing unit (GPU), a field programmable gate array (FPGA), an accelerator, an accelerated processing unit (APU), a system on chip (SoC), a microcontroller, an electronic control unit (ECU), and a digital signal processor (DSP), to name a few. In one or more variations, the processors 118 include multiple co-processors, multiple cores (e.g., a multi-core processor). In one or more other variations, the processors 118 include just one core (e.g., a single processor core).

The processors 118 rely on a memory (not shown in FIG. 1) to store the instructions for execution by the processors 118 that cause the vehicle 102 to implement various functions. For example, the vehicle 102 includes a memory circuit that stores instructions and data for executing a program (e.g., software, firmware). In one or more implementations, the memory corresponds to semiconductor memory where data is stored within memory cells on one or more integrated circuits. The memory of the processors 118 is used to store information, such as for managing merchandise and services distributed and hosted from the vehicle 102. In at least one example, the memory of the processors 118 corresponds to or includes volatile memory, examples of which include random-access memory (RAM), dynamic random-access memory (DRAM), synchronous dynamic random-access memory (SDRAM), static random-access memory (SRAM), and memristors. The memory of the processors 118 is configurable with any number of memory (e.g., physical memory) without departing from the spirit or scope of the described techniques. Alternatively or in addition, the memory of the processors 118 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). Further examples of memory configurations include low-power double data rate (LPDDR), also known as LPDDR SDRAM. The memory of the processors 118 is configurable in a variety of ways capable of supporting vehicle controls and implementation of the vehicle hosted distribution service.

The sensor devices 120 are vehicle components configured to detect characteristics of the host site 104, including changes to the characteristics. In one or more examples, the sensor devices 120 represent a sensor system that includes one or more of a camera sensor, a lidar sensor, a radar sensor, an ultrasonic sensor, a location positioning sensor, a temperature sensor, a pressure sensor, a communication sensor, a microphone, or other type of sensor. The sensor devices 120 may be configured to capture different perspectives of the host site 104, which are used for various purposes. For example, sensor data obtained from the sensor devices 120 is usable to identify the user 106 and/or infer intent of the user 106 as the user 106 approaches or moves away from the vehicle 102. The sensor data obtained from the sensor devices 120 may be used to help the vehicle 102 navigate to or from the host site 104 (e.g., to park in a garage, to exit the garage).

In at least one example, the sensor devices 120 include a camera and the sensor data output from the sensor devices 120 includes one or more images of the host site 104 and the environment 100. These images may be still images, video images, thermal images, color enhanced images (e.g., low-light images, night vision images), or other types of images. For example, the images taken by a camera of the sensor devices 120 are surround-view images that provide partial or complete panoramic views of the host site 104 from the perspective of the storage pods 108. The sensor devices 120 may include a lidar device, a radar device, or an ultrasonic device. For example, rather than taking camera images of the host site 104 and the environment 100, the lidar, radar, and/or ultrasonic devices produce measurement data for identifying objects in the environment 100 and characteristics associated with the objects. As a lidar device, the sensor devices 120 may output a lidar point cloud as measurement data. As a radar device the sensor devices 120 may output a radar data cube as measurement data.

The sensor devices 120 are configurable in a variety of ways, including for implementing specific driving related functions (e.g., autonomous driving, collision avoidance, lane centering, automated parking) and/or for implementing non-driving related functions (e.g., user authentication, storage pod management, inventory tracking). The sensor data output from the sensor devices 120 can include an object size, an object distance, an object shape, an object classification, an object position, an object orientation, an object direction, an object speed, or other object measurement. Alternatively, or in addition to object tracking and classification functions, the images and/or measurement data captured by the sensor devices 120 may enable security functions of the vehicle 102 (e.g., facial or voice recognition functions for authenticating the user 106). The sensor devices 120 are operable to generate sensor data for consumption by the processors 118, and the processors 118 are operable to implement the vehicle hosted distribution service of the vehicle 102, based on the sensor data output from the sensor devices 120.

The sensor devices 120 may be operable as input devices that generate sensor data, which the processors 118 interpret as user inputs. In this way, the sensor devices 120 implement a human machine interface (HMI) that configures the vehicle 102 to receive commands and requests from the user 106 to influence vehicle functions. For example, the sensor devices 120 capture inputs from the user 106 in response to detecting body language of the user 106, hand gestures performed by the user 106, speech produced by the user 106, and the like.

The output devices 122 are components of the vehicle 102 that are configured to output information to external devices, other vehicles, and users of the vehicle 102, such as the user 106. One non-limiting example of the output devices 122 include a speaker or sound system configured to produce audible signals in the environment 100. Another non-limiting example of the output devices 122 include a display or lighting system configured to produce visual signals in the environment 100. For example, a display device of the output devices 122 is configured to generate a graphical user interface (GUI) or control lights to convey information to the user 106. The output devices 122 may be configured to produce audible, visual, or haptic signals of a user interface to indicate a menu of the inventory of items loaded on the vehicle 102, and other inventories of items loaded on other vehicles parked in a vicinity of the host site 104.

In one or more examples, the output devices 122 communicate with external devices (e.g., mobile phones, smart watches, the distribution resources 116, home automation devices, garage door openers, other vehicles) including to transmit or receive data and requests exchanged via the network 114. For example, the output devices 122 wirelessly communicate with a garage door opener at the host site 104 to cause a garage door to open or close as the vehicle 102 is leaving or returning to the host site 104.

In at least one implementation, one or more of the sensor devices 120 and the output devices 122 are integrated in an HMI subsystem of the vehicle 102, such as an infotainment system, a vehicle console, a vehicle kiosk, or other vehicle interface. For example, the sensor devices 120 and the output devices 122 are accessible to occupants of the vehicle 102, the user 106, or other users outside the vehicle 102 to receive user input and provide user outputs. The output devices 122 can include a vehicle display that presents a GUI, which is controlled via touch input, gesture input, or voice input made by the user 106, which is received by the sensor devices 120.

The storage pod control devices 124 enable the vehicle 102 to automatically control the storage pods 108 for implementing the vehicle hosted distribution service. For example, the storage pod control devices 124 can control locks and actuators on the storage pods 108 and/or the vehicle 102 to cause access panels or doors in the storage pods 108 to open or close (e.g., to allow the user 106 to load or unload items to and from the vehicle 102). The storage pod control devices 124 may manage the detachment and subsequent reattachment of the storage pods 108 from the vehicle 102. For example, the vehicle 102 is operable to leave one or more of the storage pods 108 behind for the convenience of the user 106 when the vehicle 102 travels away from the host site 104 (e.g., to empty waste or replenish items). In one or more implementations, the storage pod control devices 124 include microcontrollers or specialized processing devices that are operable to maneuver the storage pods 108, individually, after being released (e.g., detached) from the vehicle 102. When the storage pods 108 are detached from the vehicle 102, the storage pod control devices 124 may maneuver the storage pods 108 away from the vehicle 102 (e.g., adjacent to a garage wall or corner at the host site 104). When the storage pods 108 are reattached to the vehicle 102, the storage pod control devices 124 can maneuver the storage pods 108 onto the vehicle 102, including in one or more implementations, to cause the storage pods 108 to be physically secured to the vehicle 102.

The distribution service module 126 is configured to perform various processor-controlled functions for implementing the distribution service hosted by the vehicle 102. The distribution service module 126 may be implemented using one or more of hardware, software, and firmware. For example, the distribution service module 126 is an application executed by the processors 118 to manage user interactions with inventory maintained in the storage pods 108, replenishment of the inventory, and to perform other tasks related to the distribution services.

The inventory data store 128 is maintained in a memory of the vehicle system 110, which is accessible to the distribution service module 126 (e.g., when executed by the processors 118). The inventory data store 128 may be a database or a set of lists or other data structures that maintains information or data for tracking quantities, descriptions, prices, and other properties of items that are available from the storage pods 108. When items are removed from the storage pods 108, the inventory data store 128 is updated to reflect the change in the inventory on the vehicle 102. Likewise, when the storage pods 108 are refilled, the inventory data store 128 is modified to reflect the current state of the items contained therein. The distribution service module 126 interfaces with the inventory data store 128 to obtain information for informing the user 106 about goods or services available from the vehicle 102. The information obtained from the inventory data store 128 is used by the distribution service module 126 to allow the user 106 to transact with the vehicle 102 and purchase or otherwise obtain the items contained in the storage pods 108.

In accordance with techniques of this disclosure, the distribution service module 126 causes the vehicle 102 to implement a vehicle hosted distribution service. As one example of implementing the vehicle hosted distribution service, the distribution service module 126 causes the processors 118 to execute instructions for controlling the vehicle 102 to cause the vehicle 102 to perform a parking maneuver at the host site 104 associated with the user 106. For example, the distribution service module 126 communicates with one or more vehicle subsystems that cause the vehicle 102 to exit a roadway, enter a driveway at the host site 104, and park (e.g., in the garage of the user 106). In at least one implementation, the distribution service module 126 communicates with one or more vehicle subsystems to provide access to the host site 104 for performing the parking maneuver. Access to the host site 104 may be controlled by a door, a gate, a security station, or other equipment at an entry point to the host site 104. The distribution service module 126 may cause the vehicle subsystems to communicate with external control devices that operate the door, operate the gate, or exchange information with the security station or other equipment to remove barriers that otherwise prevent the vehicle 102 from driving on to the host site 104. The distribution service module 126 interfaces (e.g., exchanges data) with these control devices to seamlessly maintain host site security or location access control while implementing the vehicle hosted distribution service. For example, the vehicle 102 waits outside a gated community or commercial location until a camera based security system determines that the vehicle 102 is registered to the user 106, at which point a gate is open to allow the vehicle 102 to drive into the neighborhood or region where the host site 104 is located. The distribution service module 126 may receive a message from the security system that indicates entry to the host site 104 is granted, and in response cause vehicle subsystems to maneuver and park the vehicle 102 at the host site 104.

The vehicle 102 remains parked at the host site 104 for the convenience of the user 106. For example, the distribution service module 126 causes the vehicle 102 to enter a standby mode where some of the vehicle subsystems are powered off and other vehicle subsystems remain powered on. The distribution service module 126 may communicate with the storage pod control devices 124 to cause a refrigerated storage pod among the storage pods 108 to remain powered on to keep perishable items cool. The distribution service module 126 may interface with the storage pod control devices 124 to cause one or more non-refrigerated storage pods of the storage pods 108 to be deactivated and placed in a secure state to keep the inventory of items on the vehicle 102 secure without consuming electrical power (e.g., lighting devices within the storage pods 108 that illuminate the contents contained therein are deactivated).

Responsive to detecting the user 106 approaching the vehicle 102, the distribution service module 126 causes the vehicle to exit the standby mode. For example, based on sensor data obtained from the sensor devices 120, the distribution service module 126 detects the user 106 among other objects located in the environment and classifies the user 106 as a human approaching the vehicle. The distribution service module 126 can automatically cause the storage pod control devices 124 to activate the lighting devices within the storage pods 108 to illuminate the inventory of items loaded on the vehicle 102.

In at least one example, the distribution service module 126 causes the processors 118 to authenticate an identity of the user 106 for authorizing access to the inventory of items loaded on the vehicle 102. For example, the sensor devices 120 capture images of the user 106 to perform facial recognition and confirm that the user 106 is authorized to access the inventory on the vehicle 102 from the host site 104. The distribution service module 126 may configure the output devices 122 to produce audible, visual, or haptic signals in the environment 100 to indicate to the user 106 that their identity is being authenticated. For example, the audible signals produced from the output devices 122 may signal the user 106 to approach closer to the vehicle 102 to enable the sensor devices 120 to capture an image of a face of the user 106, or to enable the sensor devices 120 to capture speech of the user 106 for authenticating using voice recognition.

In at least one example, responsive to authenticating the identity of the user 106, the distribution service module 126 communicates with the storage pod control devices 124 to configure the storage pods 108 to be accessible from the environment 100. For example, the distribution service module 126 commands the storage pod control devices 124 to control an access panel into the storage pods 108 to open and provide the user 106 with access to the inventory of items loaded on the vehicle 102.

In one or more scenarios, responsive to detecting a second user (e.g., that is not the user 106) approaching the vehicle 102, the distribution service module 126 refrains from authorizing access to the inventory of items when the processors 118 fail to authenticate an identity of the second user. For example, responsive to failing to authenticate the identity of the second user or determining that the second user is not authorized to access the vehicle 102, the distribution service module 126 communicates with the storage pod control devices 124 to configure the storage pods 108 to be secured and not accessible from the environment 100. For example, the distribution service module 126 commands the storage pod control devices 124 to control the access panel into the storage pods 108 to close and prevent the second user from accessing the inventory of items loaded on the vehicle 102.

With the user 106 located near the vehicle 102, the sensor devices 120 continue to capture sensor data to determine actions or intent of the user 106. For example, the sensor data indicates hand gestures or body language of the user 106. Based on the sensor data, the distribution service module 126 determines when the user 106 removes items from the storage pods 108 and identifies which of the items are removed. For example, radar data obtained from the sensor devices 120 indicates that the user 106 is removing a six-pack of cold beverages from the refrigerated storage pod.

Responsive to detecting the user 106 removing at least one item from the vehicle 102, the distribution service module 126 automatically updates the inventory to omit the at least one item. For example, the distribution service module 126 writes to a location of vehicle memory where the inventory data store 128 is maintained to annotate a list or catalogue of items and update a quantity of the items that remain on the vehicle 102 to omit the six-pack of cold beverages.

In one or more implementations, further responsive to detecting the user 106 removing the at least one item from the vehicle 102, the distribution service module 126 executes a commercial transaction to purchase the at least one item on behalf of the user 106. For example, as part of being an authorized user for the vehicle hosted distribution service on the vehicle 102, the distribution service module 126 may retain financial information (e.g., credit or debit card data, banking information) of the user 106. To provide a seamless transaction with the vehicle 102, the distribution service module 126 automatically charges a financial account of the user 106 based on the financial information. In another example, the output devices 122 are controlled by the distribution service module 126 to request the user 106 to show a credit card or otherwise present a form of payment to the sensor devices 120. For example, a camera of the sensor devices 120 captures an image of the credit card being held in the hand of the user 106 and automatically extract the financial information for executing the transaction.

With their six-pack of beverages in hand, the user 106 may move away from the vehicle 102 and return to their residence or place of business at the host site 104. In one or more examples, responsive to detecting the user 106 retreating from the vehicle 102, the distribution service module 126 controls the access panel previously opened on the storage pods 108 to close and secure the inventory of items loaded on the vehicle 102. For example, the vehicle 102 is controlled by the distribution service module 126 to re-enter the standby mode to be ready for future transactions with the user 106 but reduce energy consumption of the vehicle 102 while the user 106 is not detected by the sensor devices 120.

Eventually, the distribution service module 126 determines that the inventory data store 128 indicates a quantity of one or more of the items available from the storage pods 108 is low. To ensure that the user 106 seemingly always has access to the items, the distribution service module 126 causes the vehicle 102 to automatically replenish the inventory with items that are missing or with quantities that are running low (e.g., approaching a zero threshold quantity). For example, the distribution service module 126 controls the vehicle 102 to leave the host site 104 and autonomously drive to a distribution center for replenishing the inventory with a second instance of the at least one item removed from the vehicle 102 and omitted from the inventory. For example, the distribution service module 126 communicates with a vehicle controller (e.g., one or more of the processors 118) to cause the vehicle 102 to autonomously navigate to a neighborhood merchant, store, warehouse, etc. where additional inventory of items is available to the vehicle 102 and other autonomous vehicles that implement the vehicle hosted distribution service.

In one or more implementations, the distribution service module 126 determines a most convenient time to replenish the inventory onboard that is not likely to inconvenience the user 106 as the vehicle 102 is no longer parked at the host site 104. The distribution service module 126 may determine a time of day when an absence of the vehicle 102 from the host site 104 does not inconvenience the user 106. For example, the distribution service module 126 is configured based on user inputs to replenish the inventory during a window of time designated by the user 106. In another example, the distribution service module 126 accesses a schedule (e.g., user calendar) to determine when the user 106 is away from the host site 104 and not likely to use the vehicle hosted distribution service. In one or more other examples, the distribution service module 126 uses machine-learning to determine patterns or habits of the user 106 for learning (e.g., over time) when the user 106 is more likely to visit the vehicle 102 and when the user is less likely to need items from the inventory on the vehicle 102.

At the time of day that is determined by the distribution service module 126 to not inconvenience the user 106, the vehicle 102 leaves the host site 104 and drives to the distribution center. For example, the distribution service module 126 causes the processors 118 to execute instructions for controlling the vehicle 102 to cause the vehicle 102 to leave the host site 104 and drive to the distribution center during the time of day when the absence of the vehicle 102 from the host site 104 does not inconvenience the user 106. For example, the distribution service module 126 communicates with one or more vehicle subsystems that cause the vehicle 102 to exit the parking location and leave the driveway at the host site 104 to drive on the roadway and travel to the distribution center.

At the distribution center, the vehicle 102 may be greeted by human or robot workers who load items on the vehicle 102 for distribution and sale at the host site 104. For example, the vehicle 102 parks outside the distribution center or enters a garage bay where the storage pods 108 are open and configured to receive additional items or goods. The distribution service module 126 may configure the vehicle 102 (e.g., the storage pods 108) to receive the items loaded from the distribution center. For example, access panels or doors to the storage pods 108 are open to allow products and items to be inserted into their respective storage bays. As items are loaded on the vehicle 102, the distribution service module 126 is configured to monitor the items being added to the inventory and updates the inventory data store 128 to reflect the additional quantity of items being loaded. For example, the sensor devices 120 generate sensor data to track items being loaded into the storage pods 108 such that the inventory is update automatically. In one or more other examples, the distribution service module 126 provides an HMI via the output devices 122 to allow the human or robot workers to indicate the items being loaded in the storage pods 108, and the distribution service module 126 updates the inventory data store 128 accordingly.

Responsive to updating the inventory data store 128 to include additional items or another instance of the item that was removed (e.g., one or more additional six-packs of the beverage consumed by the user 106), the distribution service module 126 causes the vehicle 102 to return to the host site 104 with the additional items and the other instance of the item that was removed, which has been included in the inventory. For example, the vehicle 102 returns to the host site 104, parks in the garage, and is ready for the next time the user 106 approaches the vehicle 102 to consume items from the inventory.

In this way, the user 106 of the vehicle hosted distribution service can spend less time involved with shopping issues that otherwise detract from their productivity and interfere with enjoyment of their lives. With the user 106 utilizing the vehicle hosted distribution service, traffic and/or vehicle emissions are reduced. The distribution service module 126 controls the vehicle 102 to streamline the shopping process and reduce reliance of the user 106 on personal vehicles and delivery services for promoting more sustainable and efficient practices in a communities where the host site 104 is located.

Figure 2:
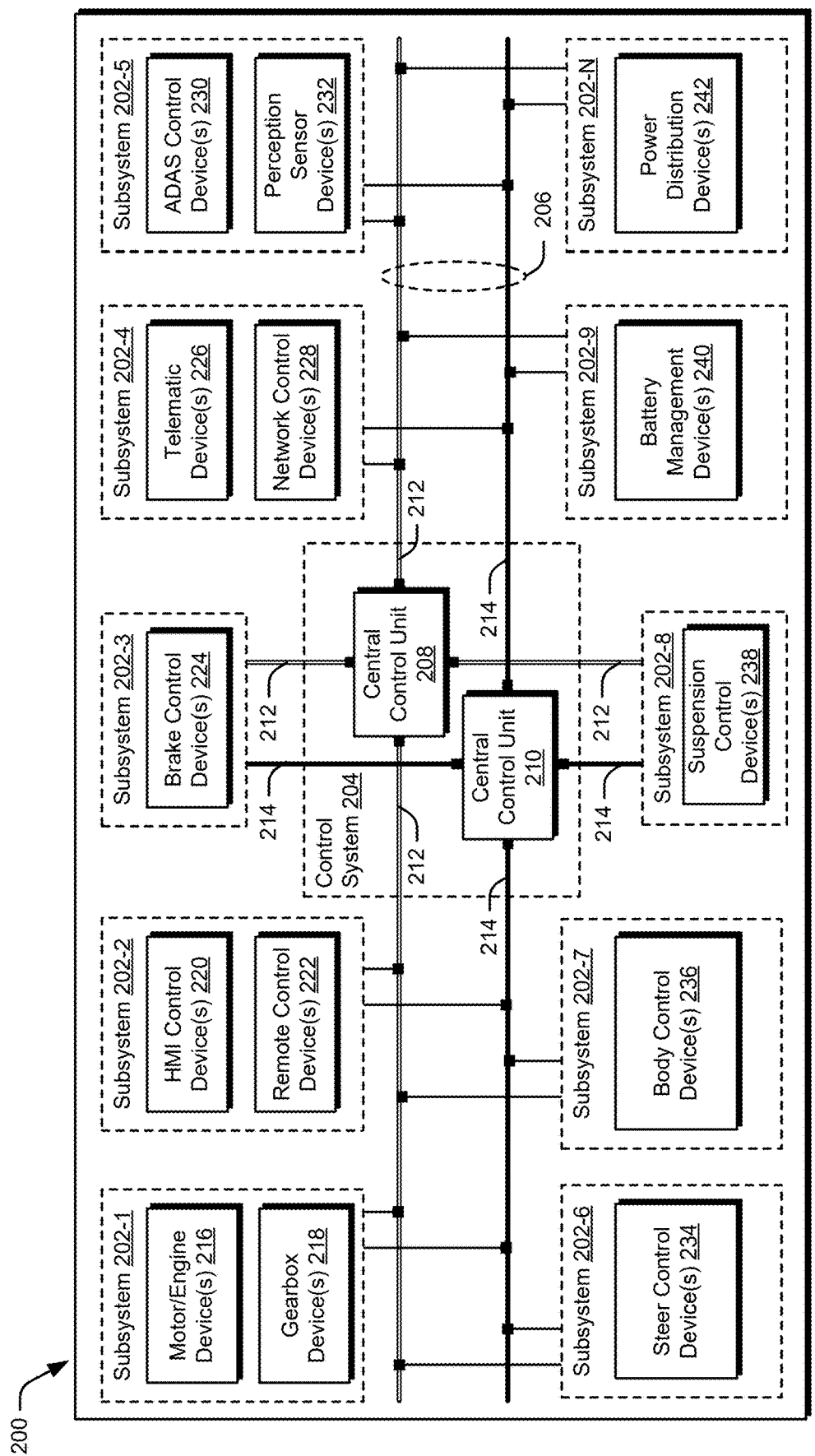
FIG. 2 is a block diagram of a non-limiting example of a vehicle system of an autonomous vehicle that implements an autonomous vehicle hosted distribution service.

FIG. 2 is a block diagram of a non-limiting example of a vehicle system 200 of an autonomous vehicle that implements an autonomous vehicle hosted distribution service. For ease of description, the vehicle system 200 is described in the context of the environment 100 shown in FIG. 1 including with reference to similar labeled elements. For example, the vehicle system 200 is a more-detailed version of the vehicle system 110 installed in the vehicle 102. The vehicle system 200 includes a plurality of subsystems 202 (labeled individually as subsystem 202-1 through subsystem 202-N, where N is any integer) that are managed by a control system 204 to implement various vehicle functions. In at least one example, the vehicle system 200 includes additional or fewer subsystems 202 than those depicted in FIG. 2.

The control system 204 is configured as a centralized controller that enables information to transfer between the subsystems 202 over a network 206. By exchanging information with the subsystems 202, the control system 204 causes the subsystems 202 to execute subsystem functions that enable driving or delivering messages to people in a vicinity of the vehicle 102 (e.g., in the environment 100). For instance, the control system 204 receives signals output on the network 206 from one of the subsystems 202, and based on information inferred from the signals, the control system 204 outputs additional signals on the network 206 to cause a particular behavior of another of the subsystems 202 (e.g., to cause one or more of the subsystems 202 to drive the vehicle 102 to the host site 104, to cause one or more of the subsystems 202 to manage access to items contained in the storage pods 108, etc.).

The control system 204 includes a central control unit 208 and a central control unit 210. The central control unit 208 and the central control unit 210 represent separate processors, processor cores, control units, microcontrollers, system on chips, or other processor technology. For example, the central control unit 208 and the central control unit 210 are examples of the processors 118. The central control unit 208 and the central control unit 210 may execute the distribution service module 126 and maintain the inventory data store 128. In this way, each of the central control unit 208 and the central control unit 210 are configured to execute instructions either as software or firmware to implement functionality of the vehicle 102 and the control system 204. Although not shown, in some examples, the control system 204 includes a non-transitory computer-readable storage medium (e.g., data store, cache, static memory, dynamic memory, flash memory, disk storage) that maintains the instructions and data for implementing the instructions executed by each of the central control unit 208 and the central control unit 210. For example, the central control unit 208 and the central control unit 210 include respective data stores that contain the instructions, which upon retrieval from the data stores, are executed during operation of the vehicle 102. In one or more examples, data and instructions for implementing the distribution service module 126 and/or the inventory data store 128 are executed by one or more of the central control unit 208 and the central control unit 210.

In another implementation, the control system 204 is distributed throughout the vehicle system 200 in two or more locations. In such a distributed implementation, the central control unit 208 is included in a first part of the control system 204 arranged at one part of the vehicle 102 (e.g., a front portion) and the central control unit 210 is included in a second part of the control system 204 positioned at another part of the vehicle 102 (e.g., a rear portion). In other distributed implementations, each part of the control system 204 includes one or more multiple instances of the central control unit 208 and/or the central control unit 210.

In one or more examples, the central control unit 208 and the central control unit 210 are functionally redundant. For example, the processors of each of the central control unit 208 and the central control unit 210 are operable to concurrently receive a same set of inputs from the subsystems 202 and concurrently send a same set of outputs to the subsystems 202. In a similar way, the processors of each of the central control unit 208 and the central control unit 210 are operable to concurrently receive the same set of inputs from the subsystems 202 and concurrently send the same set of outputs to the subsystems 202 regardless of whether that processor is being used to actively control operations of the vehicle 102.

The subsystems 202 of the vehicle system 200 rely on equivalent control operations of either the central control unit 208 or the central control unit 210 (e.g., one at a time) to actively cause vehicle operations or vehicle functions to be performed by the subsystems 202. For example, while the central control unit 208 is orchestrating operations of the subsystems 202, the central control unit 210 is maintained in a ready, standby state. If the central control unit 208 fails, then the control system 204 activates the central control unit 210 to take over and manage the subsystems 202 where the central control unit 208 left off. When the central control unit 210 takes over, the vehicle 102 may be forced to operate in a safe state, which can include maneuvering away from other vehicles, objects, and pedestrians to come to a controlled stop. This way, the functional redundancy implemented by the central control unit 208 and the central control unit 210 help the control system 204 to satisfy requirements for reliability and safety. In such implementations, the central control unit 208 and the central control unit 210 may be located at different locations within the vehicle.

The network 206 represents any suitable vehicle network technology, including wired and wireless signal propagation mediums. The network 206 enables real-time data exchange, safety enhancements, and efficient traffic management among the components of the vehicle system 200. The network 206 can include various switches, routers, transceivers, controllers, chokes, filters, terminations, and other networking equipment beyond transmission lines, cables, wires, busses, and other signal routing technologies. In an aspect, the network 206 adheres to an in-vehicle networking protocol. For example, the network 206 represents a combination of one or more of a controller area network (CAN), an automotive ethernet network (AEN), serializer/deserializer (SerDes) network, local interconnect network (LIN), or a FlexRay network (FRN).

In at least one example, to implement the redundancy of the control system 204, the network 206 is composed of dual physical network paths or network channels. In at least one example, the central control unit 208 and the central control unit 210 are operable to concurrently exchange a same set of inputs and outputs with the subsystems 202 over different respective channels (e.g., logical channels, physical channels) of the network 206 that link the subsystems 202 to that central control unit (e.g., the processors 118). A network channel 212 or network path communicatively couples each of the subsystems 202 to the central control unit 208. A separate network channel 214 or network path communicatively links each of the subsystems 202 to the central control unit 210. For example, the network channel 212 is utilized by the central control unit 208 to exchange data over the network 206, and the network channel 214 is utilized by the central control unit 210 to exchange data over the network 206. In at least one implementation, if a failure at the central control units 208 is at least partially caused by a fault in the network channel 212, the central control unit 210 is unaffected by the network fault and operable to communicate with the subsystems 202 using the network channel 214. The functional redundancy implemented by the network channel 212 and the network channel 214 further helps the control system 204 to satisfy the requirements for reliability and safety.

In at least one other example, to implement the redundancy of the control system 204, the network 206 is composed of dual logical network paths or channels. The network channel 212 and the network channel 214 may be separate logical paths through the network 206 that communicatively link each of the subsystems 202 to the central control unit 208 and the central control unit 210 using the same physical wires. In at least one example, the central control unit 208 and the central control unit 210 are operable to interleave a same set of inputs and outputs concurrently exchanged with the subsystems 202 over a same set of channels (e.g., logical or physical channels) of the network 206 that link the subsystems 202 to that central control unit (e.g., the processors 118). For example, communications two and from the central control unit 208 and the central control unit 210 are interleaved on a single set of wires that make up the network 206. If a failure at the central control unit 210 and/or the network channel 214 occurs, communications from the central control unit 208 can reach the subsystems 202 using the network channel 212. The functional redundancy implemented by interleaving the network channel 212 and the network channel 214 further helps the control system 204 to satisfy the requirements for reliability and safety.

The subsystems 202 include one or more edge devices (e.g., the sensor devices 120, the output devices 122, the storage pod control devices 124) operatively coupled to the network 206 to provide information to the control system 204 and receive commands from the control system 204 to implement various vehicle functions. For example, each of the subsystems 202 can include one or more actuators, microcontrollers, machines, or other equipment to perform specific vehicle tasks at the discretion of the edge devices that are contained within the subsystems 202. The sensor devices 120, the output devices 122, and the storage pod control devices 124 are not shown in FIG. 2, however, each is included among one or multiple of the subsystems 202.

A subsystem 202-1 is a propulsion or drive subsystem. Motor/engine devices 216 of the subsystem 202-1 represent edge devices managed by the control system 204 to command vehicle propulsion units (e.g., an engine, a motor) to execute driving functions of the vehicle 102 (e.g., forward motion, reverse motion, acceleration, deceleration). In one or more examples, the motor/engine devices 216 manages operations of an engine of the vehicle 102, including fuel injection, ignition timing, emissions control, and engine health monitoring. In at least one aspect (e.g., in context of electric vehicles), the motor/engine devices 216 control inverters and motors that convert electric energy into mechanical energy for applying torque to wheels.

In addition, the subsystem 202-1 includes gearbox devices 218. Also referred to as a powertrain control module (PCM) and/or a transmission control module (TCM), transmission and gearbox functions are overseen by the gearbox devices 218 to implement an automatic transmission, optimize gear changes (e.g., gear shifts), and control torque delivered to the wheels of the vehicle 102. A vehicle may include one or more instances of the subsystem 202-1 (e.g., one subsystem 202-1 for each axle).

A subsystem 202-2 is an HMI subsystem. The subsystem 202-2 includes one or more HMI control devices 220 that implement a vehicle user interface. For example, the HMI control devices 220 include one or more of the sensor devices 120 and one or more of the output devices 122. The vehicle user interface enables interaction between occupants (e.g., driver, passenger) of the vehicle 102 and the vehicle system 200, which enables human intervention in vehicle functions and driving. The vehicle user interface further enables interaction between people outside the vehicle (e.g., the user 106) and the vehicle system 200. For example, the HMI control devices 220 control the output devices 122 (e.g., vehicle displays, vehicle dash clusters, head-up display units, haptic feedback, audible feedback, and other visual aids) to help with driving or implementing the vehicle hosted distribution service described herein. In one or more implementations, the HMI control devices 220 configure one or more of the sensor devices 120 as HMI input devices to provide a human-interface to effect delivery of items or inventory made available from the vehicle 102, or vehicle operations, such as climate controls (e.g., heating, cooling), cabin features (e.g., infotainment, lighting), other vehicle body features (e.g., windshield wipers, transmission settings, suspension settings, drive mode selection, power seating, power mirrors, power door locks).

The subsystem 202-2 also includes one or more remote control devices 222 that allow human or machine inputs to control the vehicle 102 from outside the cabin. For example, in an autonomous or semi-autonomous vehicle context, the remote control devices 222 receive commands over a communication link with a base station (e.g., a mobile phone, a key fob, the distribution service platform 112) to allow a human or machine operator to control the vehicle 102 as if the driving commands are provided directly to the HMI control devices 220. In hot or cold weather, to pre-cool or pre-heat the cabin, the remote control devices 222 activate remote starting functions. The remote control devices 222 in at least one aspect allow door locks to be unlocked or locked and doors, tailgates, or trunks to be remotely opened or closed.

A subsystem 202-3 represents a braking subsystem of the vehicle system 200. For example, one or more brake control devices 224 are operable to manage anti-lock braking systems (ABS), electronic stability controls (ESC), and otherwise convert driver inputs at the HMI control devices 220 to effect performance of vehicle brakes (e.g., for stopping, for decelerating). In some examples, the brake control devices 224 represent a braking control module (BCM).

Another of the subsystems 202 depicted in FIG. 2 includes a subsystem 202-4, which is an onboard-vehicle communication subsystem. The subsystem 202-4 manages telematics and communications that occur within the vehicle 102, and with other devices located outside the vehicle 102. For example, the subsystem 202-4 interfaces with the various edge devices coupled to the network 206 to ensure healthy exchange of data that is free of errors or faults. In addition, the subsystem 202-4 interfaces with other vehicles, mobile devices, infrastructure, and remote computing systems to implement various vehicle functions. For example, the subsystems 202-4 interface (e.g., exchange data) with the distribution resources 116 via a network connection through the network 114 with the distribution service platform 112. One or more network control devices 228 of the subsystem 202-4 monitor network health of the network 206 and facilitate communication protocols implemented therein. The network control devices 228 are configured to diagnose problems with the network 206 to reroute signals and prevent data loss.

One or more telematic devices 226 of the subsystem 202-4 handle offboard communications of the vehicle 102. This includes implementing vehicle-to-vehicle (V2V) and vehicle-to-everything (V2X) communications that enable the vehicle 102 to communicate with other intelligent vehicles and systems in an operating environment (e.g., on or near a roadway). The telematic devices 226 interface with over-the-air (OTA) update services to update software on the vehicle 102. In addition, the telematic devices 226 interface with a positioning system to assist with navigation functions. Other features implemented by the telematic devices 226 include remote diagnostics, and interfacing with emergency response services (e.g., to automatically alert emergency responders in the event of an accident, to automatically receive emergency alerts for dispatching the vehicle 102 to provide medical supplies, medicine, medical equipment to an emergency location).

A subsystem 202-5 is an advanced driving and safety (ADAS) subsystem of the vehicle system 200. The subsystem 202-5 has two main functions, including implementing an ADAS as well as a perception sensor system. For example, one or more ADAS control devices 230 implement ADAS functionality that includes autonomous or semi-autonomous control, adaptive cruise control, emergency braking, lane centering, and other ADAS functions. One or more perception sensor devices 232 support the ADAS control devices 230 by providing information about the driving environment to ensure safe driving and/or safe interactions with people and other vehicles or machines located in the environment 100. For example, a radar, a camera, a lidar, an ultrasonic sensor, a global position system (GPS) sensor, an inertial measurement unit (IMU), and other sensor technology are examples of the sensor devices 120 that are deployed by the perception sensor devices 232 to collect sensor data about the environment 100. Sensor fusion techniques, object detection, lane centering, path trajectory planning, and other perception sensor functions are executed by the perception sensor devices 232 to enable the ADAS functions performed by the ADAS control devices 230.

A subsystem 202-6 is a steering subsystem that controls elements of the vehicle, which steer the wheels. One or more steer control devices 234 integrate with an electric power steering system of the vehicle 102 to control direction of the vehicle wheels. The steer control devices 234 receive inputs from the HMI control devices 220 and/or the control system 204, which are translated into appropriate steering commands for controlling steering actuators that change the direction of the wheels for steering and performing evasive maneuvers.

A subsystem 202-7 represents a body control subsystem of the vehicle 102. Included in the subsystem 202-7 are one or more body control devices 236, which oversee functions related to vehicle body controls. For example, window actuators, door locks and latches, interior and exterior lighting, tailgate and trunk latches, and the like are controlled by the body control devices 236 at the command of the control system 204 and/or one or more of the other subsystems 202 (e.g., the HMI control devices 220). In one or more examples, the storage pod control devices 124 are included within the subsystem 202-7. For example, like body controls on the vehicle 102, storage pod controls are operable to open, close, lock, or unlock the storage pods 108 to provide or restrict access to items in the inventory of the vehicle 102.

A subsystem 202-8 is an active suspension control subsystem. One or more suspension control devices 238 implement functions of a suspension control module (SCM) to regulate suspension components to adjust a ride level of the vehicle 102. For example, the suspension control devices 238 configure a vehicle suspension to be stiffer on paved surfaces for improved driving performance and maneuverability. In an offroad setting, the suspension control devices 238 enable a softer suspension setting to provide a smoother ride.

A subsystem 202-9 represents a battery management subsystem of the vehicle 102. One or more battery management devices 240 monitor performance of a battery pack (also referred to as a traction battery) to ensure appropriate charging and discharging rates to promote longevity and overall battery health. The battery management devices 240 control charging operations of on board vehicle batteries as well as controlling battery usage (e.g., to control a rate of discharge). The battery management devices 240 monitor health of vehicle batteries to alert the control system 204 when a malfunction is imminent or occurring.

Finally, a subsystem 202-N is depicted in FIG. 2, which represents a power distribution system. One or more power distribution devices 242 of the subsystem 202-N manage the distribution of electrical power from energy sources on the vehicle 102 to the vehicle system 200. For example, the power distribution devices 242 control power switches, inverters, converters, and other electrical distribution components to ensure the subsystems 202 receive an appropriate level of current and voltage for implementing vehicle functions. The power distribution devices 242 can include fault protection circuits and breakers to interrupt power to a faulty subsystem and maintain safe electrical conditions while the vehicle 102 remains active. The power distribution devices 242 interface with the motor/engine devices 216 and the battery management devices 240 to manage safe electrical conditions throughout the vehicle system 200.

Figure 3:
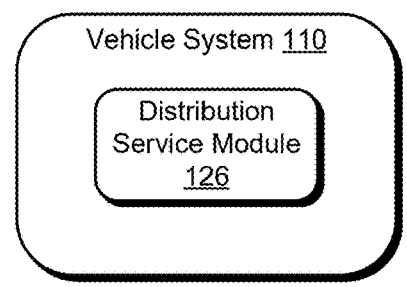
FIG. 3 is a block diagram of a non-limiting example of a fleet service system for managing an autonomous vehicle hosted distribution service.
Figure 3:
Figure 3:
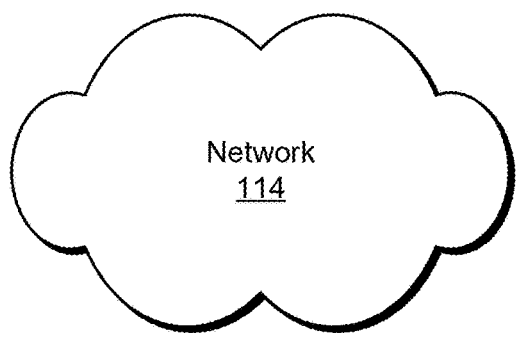
Figure 3:
Figure 3:
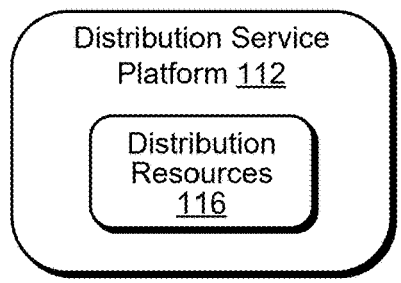

FIG. 3 is a block diagram of a non-limiting example of a fleet service system 300 for managing an autonomous vehicle hosted distribution service. The fleet service system 300 includes the distribution service platform 112, which is an example of a cloud based fleet service platform that centrally manages the vehicle 102 to control operations of the vehicle 102 and other vehicles that provide their own vehicle hosted distribution services. In one or more examples, the distribution service platform 112 aggregates items among vehicles, executes commercial negotiates with suppliers for the items, and facilitates efficient exchanges and delivery of the items by managing the vehicle inventories.

For example, the distribution resources 116 of the distribution service platform 112 exchange data over the network 114 with the vehicle system 110 and the distribution service module 126 to enable the vehicle hosted distribution service provided by the vehicle 102. The distribution resources 116 may include a computer-readable storage medium and processing devices installed in a remote computing system to communicatively couple to the vehicle 102 to the distribution service platform 112 and/or other vehicles in the fleet. With the centralized control provided by the fleet service system 300, collaboration between the vehicle 102 and other vehicles is implemented to help each vehicle perform its tasks. For example, if the vehicle 102 is making a trash dump, the vehicle 102 may leave one or more storage pods 108 at the host site 104 and from instructions obtained from the distribution resources 116, be caused to travel around to collect garbage compartments that are full on other nearby vehicles. The vehicle 102 may arrive at host sites of the other vehicles (e.g., at the curb at these residences) and the garbage compartments can autonomously detach from their vehicles and navigate to the curb to rejoin the vehicle 102. Then after dumping the trash, the distribution resources 116 communicate with the distribution service module 126 to cause the vehicle 102 to return to each host site and return the garbage compartments to each of the hosted vehicles.

The fleet service system 300 may improve efficiency of the vehicle hosted distribution service provided by the vehicle 102 and other vehicles in its fleet. In at least one example, the vehicles autonomously collaborate through vehicle-to-vehicle communication enabled by the distribution service platform 112. In at least one other example, the vehicles interface with the distribution service platform 112 to receive instructions on tasks assigned to them. For example, if overlap exists among the tasks implemented by the various vehicles, the distribution resources 116 can manage and designate responsible vehicles for completing each of the different tasks. The vehicle 102 may receive a command from the distribution resources 116 to collect the neighborhood trash. The other vehicles 102 may meet up with the vehicle 102 at a nearby location to resolve inventories, return borrowed compartments, etc., based on central commands delivered to vehicle systems through the network 114. For example, one vehicle travels to a grocery depot with a refrigerator pods of one or more other vehicles, while another vehicle travels to a department or electronic store to pick up items requested from its user and users of the other vehicles. Before returning to their respective host sites, the vehicles meet to exchange compartments or individual items that were picked up on their behalf.

In one or more examples, the fleet service system 300 manages shared services provided by one or more vehicles. For example, the vehicle 102 keeps medicine, medical supplies, or medical equipment (e.g., a small respirator, a defibrillator) that are too expensive to be included on every vehicle managed by the fleet service system 300. When a neighbor makes an emergency phone call, The fleet service system 300 causes the vehicle 102 to automatically receive an alert from an emergency response service, and drive to the location of the emergency with the medical supplies (e.g., to meet the paramedics, to allow the occupants at the neighbor house to perform medical actions). For example, the distribution service module 126 receives an alert transmitted through the network 114 from an emergency response service provided by the distribution service platform 112 to request the medicine, the medical supplies, or the medical equipment on the vehicle 102 to be delivered to an emergency location that is at a different location than the host site 104. Based on the instructions or commands received from the network 114, the distribution service module 126 controls the vehicle 102 to leave the host site 104 and drive to the emergency location for delivering the medicine, the medical supplies, or the medical equipment in response to the alert.

Figure 4:
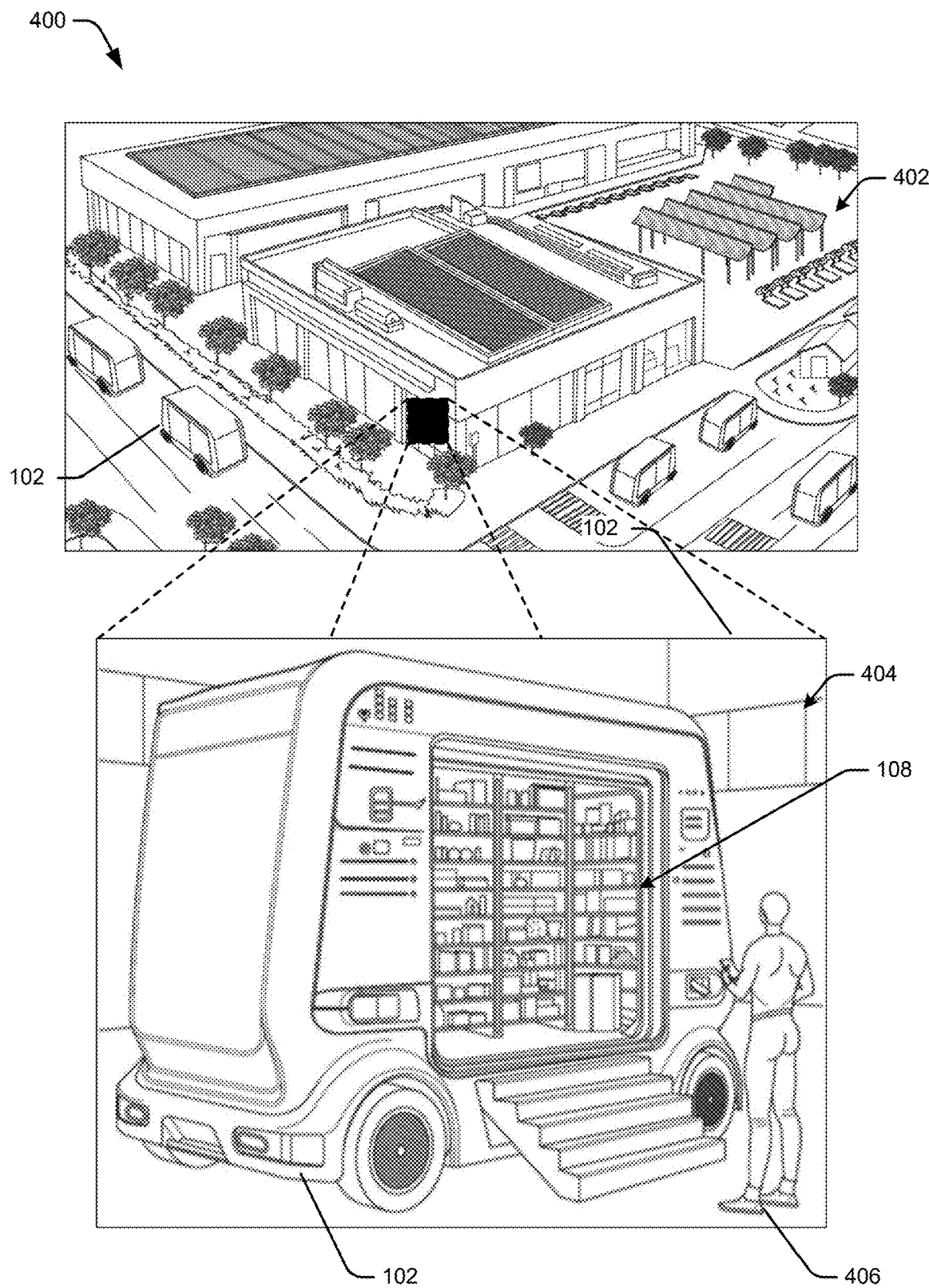
FIG. 4 depicts a non-limiting example scenario of an autonomous vehicle hosted distribution service.

FIG. 4 depicts a non-limiting example scenario 400 of an autonomous vehicle hosted distribution service. The scenario 400 depicts a neighborhood distribution center 402 (e.g., a warehouse a supermarket, a store). For example, the neighborhood distribution center 402 has hundreds or thousands of robot or human workers fulfilling orders (e.g., picking items from shelves and packing them for delivery).

When the vehicle 102 arrives at the neighborhood distribution center 402, the workers stock the vehicle 102 with items that user 106 ordered or items that are predictively stocked based on based an order history and/or other contextual information about the user 106 (e.g., calendar, social media, friends, popularity). For example, the vehicle 102 uses machine-learning to determine, based on an online presence of the user 106, one or more other items that the user 106 is predicted to use at the host site 104. The distribution service module 126 may predict that flowers or candy are popular items sold on Valentine's Day. On the evening before Valentines Day, the distribution service module 126 commands the vehicle 102 to autonomously visit the neighborhood distribution center 402 to be stocked with flowers, candy, cards, and such. The distribution service module 126 controls the vehicle 102 to leave the host site and drive to the neighborhood distribution center 402 for adding the one or more other items to the inventory.

A worker 406 at a replenishment location 404 at the neighborhood distribution center 402 ensures the vehicle 102 has a correct inventory or notices any other items to be added to the vehicle 102. For example, responsive to updating the inventory to include the one or more other items, the distribution service module 126 controls the vehicle 102 to return to the host site 104 with the one or more other items.

That way, the next day (i.e., on Valentines Day) the user 106 can purchase the flowers from the vehicle 102 by walking to their garage at the host site 104 and removing the items from one of the storage pods 108. In this way, the vehicle 102 is operable to interface with the neighborhood distribution center 402 to provide a last mile distribution of items.

Figure 5:
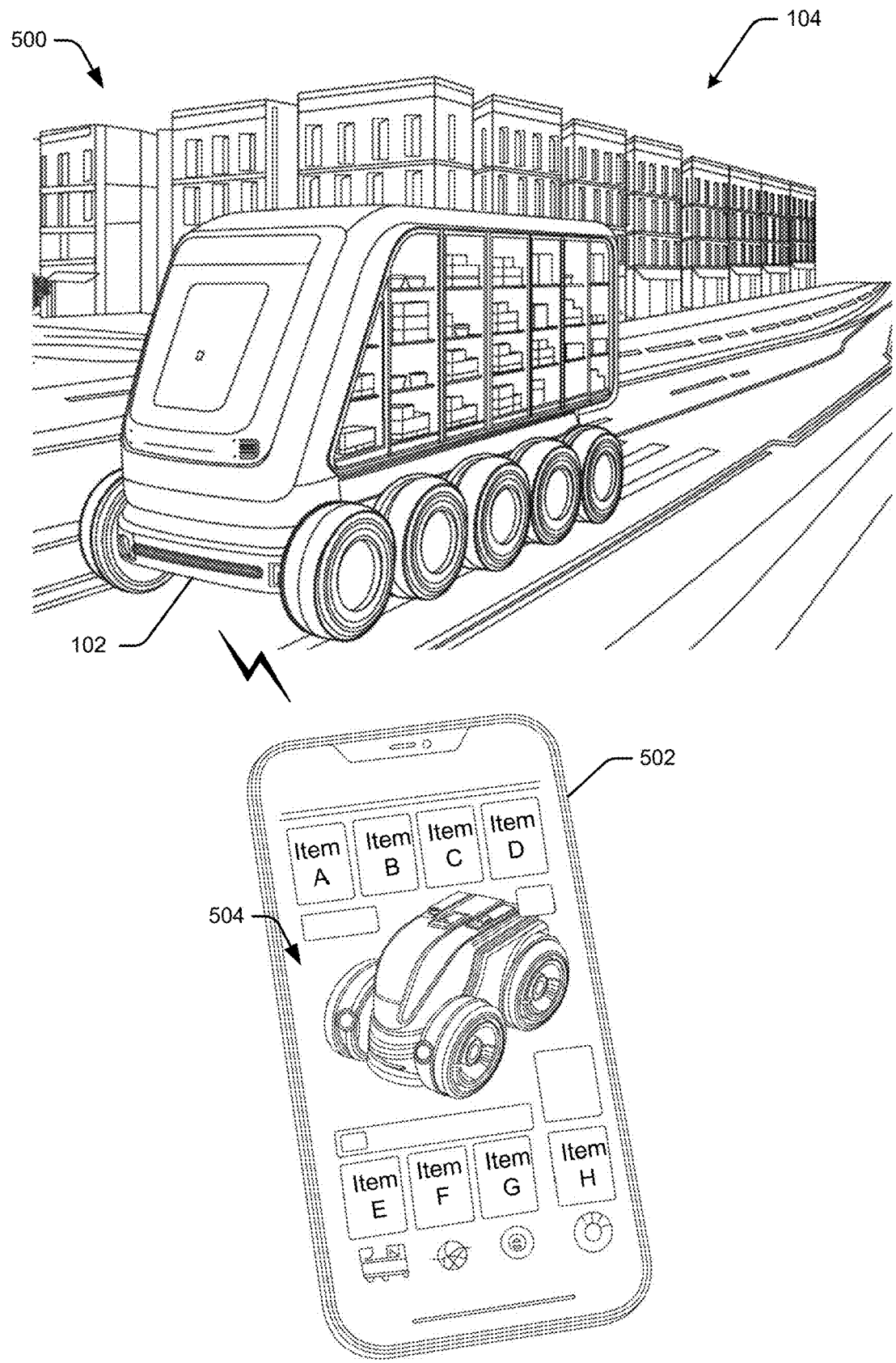
FIG. 5 depicts a non-limiting example scenario of an autonomous vehicle hosted distribution service.

FIG. 5 depicts a non-limiting example scenario 500 of an autonomous vehicle hosted distribution service. The scenario 500 illustrates how in crowded environments (e.g., urban centers, apartment complexes) a resident (e.g., the user 106) at the host site 104 may not have a dedicated parking location, garage, or space where the vehicle 102 can remain parked. In this situation, the vehicle 102 may be hosted at the host site 104, which is shared among multiple users within a neighborhood, city, apartment complex. For example, the user 106 is a first user that has a first residence at the host site 104 (e.g., a first apartment, townhouse, condominium) and a second user has a second residence at the host site 104 (e.g., a second apartment, townhouse, condominium). In this way, multiple residents, or users at the host site 104 share access to the vehicle 102.

In at least one implementation, one or more of the storage pods 108 is reserved for the user 106 (e.g., the first user) and one or more other of the storage pods 108 contains items reserved for another user (e.g., the second user). Said differently, a first subset of the storage pods 108 includes a first subset of the inventory on the vehicle 102 including a first subset of the items reserved for the first user, and a different subset of the storage pods 108 includes a different subset of the inventory including a different subset of the items reserved for the second user.

In at least one example, the inventory on the vehicle 102 is shared among the multiple users at the host site 104. For example, the first and second users are authenticated by the distribution service module 126 to provide access to all the storage pods 108 on board the vehicle 102. For example, one of the storage pods 108 that is stocked with groceries includes favorite items of each of the nearby residents, or items generally applicable to the multiple users.

Also depicted in the scenario 500 is a mobile device 502 configured to output a user interface 504 (e.g., a GUI) associated with the distribution service module 126. While the vehicle 102 may automatically replenish and stock items in the inventory using machine-learning or predictions about the user 106, in some cases, the user 106 contributes to the selection of items for the inventor on the vehicle 102 by providing user inputs to the user interface 504. The user interface 504 can indicate a menu of the inventory of items loaded on the vehicle 102 and may further indicate other inventories of items loaded on other vehicles parked in a vicinity of the host site 104.

As one example, the user 106 can visually inspect the contents of the vehicle 102 by interacting with the storage pods 108 and/or the output devices 122 on the vehicle 102. As another example, the user 106 interacts with the user interface 504 to view a list of items already onboard the vehicle 102 as well as to make selections of other items that are available to be stocked. From the user interface 504, the user 106 can browse everything currently inside the vehicle 102 and everything else available to be added to the inventory. From providing inputs to the vehicle 102 or inputs to the user interface 504, the user 106 can request additional or different items to be added to the vehicle inventory or cause the vehicle 102 to run an errand (e.g., deliver or pickup packages, take out the trash, exchange items with another vehicle).

In one or more examples, items on other nearby vehicles at the host site 104 or in vicinity of the host site 104 (e.g., within a threshold distance of a few kilometers) are presented to the user 106 through the user interface 504. The user can interact with the user interface 504 or the vehicle 102 to have items from these other vehicles delivered to the host site 104 in minutes. For example, the vehicle 102 can travel to a neighboring vehicle and automatically retrieve a requested item from the inventory of the neighboring vehicle (e.g., by deploying a robotic arm to move items from the other vehicle into the storage pods 108 on the vehicle 102). The vehicle 102 returns to the user 106 with the requested items being made available from its inventory. Said differently, two or more instances of the vehicle 102 can trade or exchange items to improve their inventories. Vehicle inventories may be aggregated in the user interface 504 for the user 106 to have a greater selection of items than what is on their vehicle.

In some examples, two or more instances of the vehicle 102 collaborate to aggregate a predicted inventory that is generally available from each of the vehicles. For example, based on popular items purchased on different days and times, the inventory of each instance of the vehicle 102 is adjusted to have popular items likely to be purchased. Imagine the user 106 is preparing to cook dinner and checks the user interface 504 to browse groceries or premade meals available on other vehicles within one or two-minute radius. After noticing another vehicle has everything for a chicken dinner, the user 106 orders those items and the vehicle 102 causes them to appear almost instantly (e.g., by retrieving the items from the other vehicle, by summoning the other vehicle to deliver the items to the host site when not currently being accessed by its own user). For example, the distribution service module 126 controls the vehicle to leave the host site 104 and drive to a remote location for replenishing the inventory with a second instance of an item previously removed from the vehicle 102. The distribution service module 126 controls the vehicle to obtain the second instance of the item from a storage pod of another vehicle parked at the remote location. Then, responsive to updating the inventory data store 128 to include the second instance of the item, the distribution service module 126 controls the vehicle 102 to return to the host site 104 with the second instance of the item included in the inventory.

Figure 6:
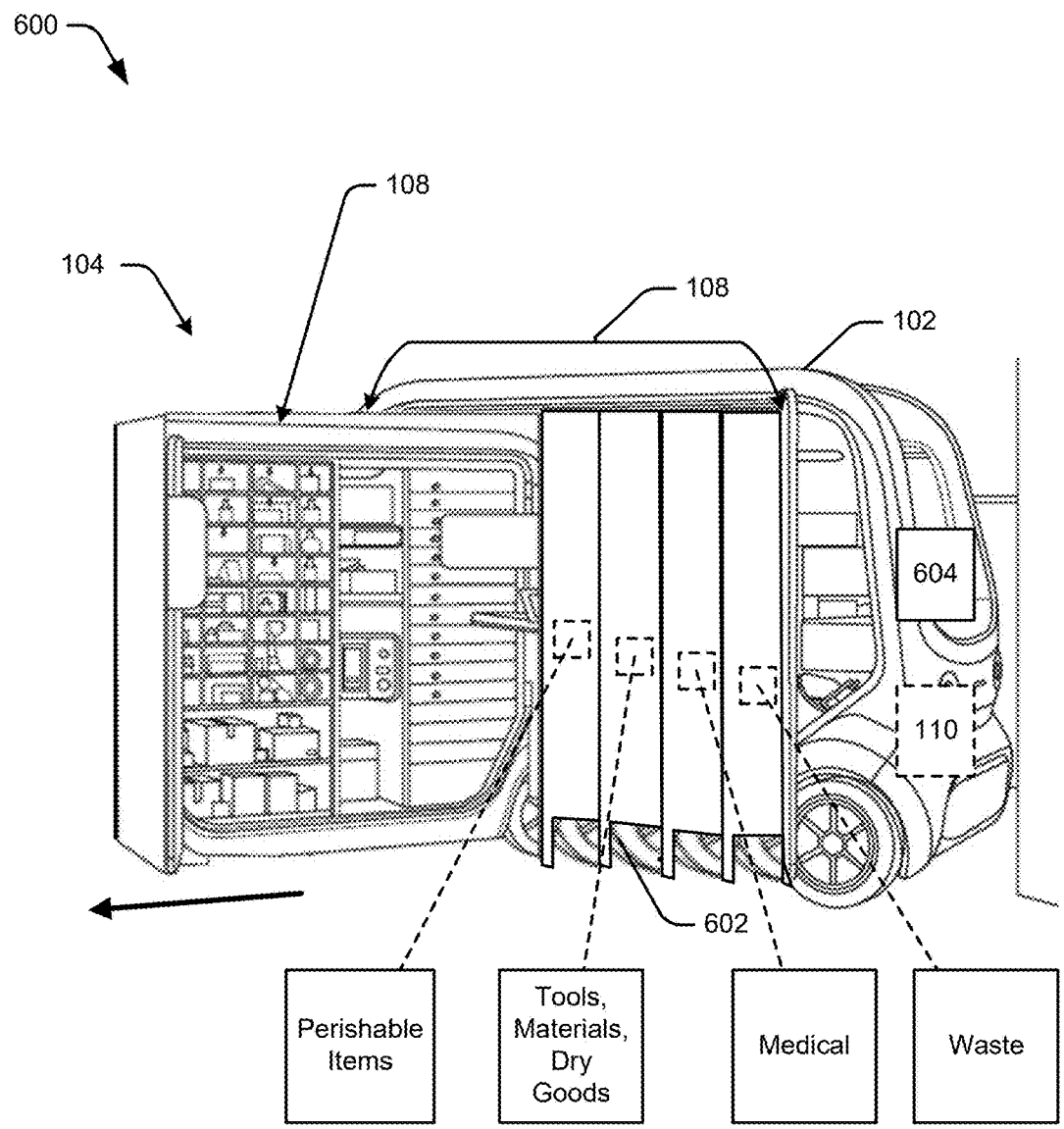
FIG. 6 depicts a non-limiting example of an autonomous vehicle that implements an autonomous vehicle hosted distribution service.

FIG. 6 depicts a non-limiting example 600 of an autonomous vehicle that implements an autonomous vehicle hosted distribution service. A perspective view of the vehicle 102 is illustrates the storage pods 108 that may be used to implement the vehicle hosted distribution service implemented by the distribution service module 126.

In one or more examples, the storage pods 108 are removable compartments, which are removable from the vehicle 102, such as, to be left behind and kept at the host site 104 (or other remote location) unless the vehicle 102 is performing a task to utilize it (e.g., emptying or filling the storage pods 108 off-site. For example, when the waste compartment of the storage pods 108 is full and needs emptying at the waste disposal site, the grocery compartment of the storage pods 108 is left behind at the host site 104 for consumption by the user 106. The storage pods 108 are removable in one or more implementations and can slide out of the vehicle 102 and stand on their own at the host site 104 or wherever the vehicle 102 is parked. For example, the storage pods 108 detach from the vehicle 102 and move (e.g., roll on wheels) away from the vehicle 102 to reveal the items or components contained therein. Each of the storage pods 108 may have a mobility platform 602 to carry the storage pods 108 and their contents on the ground to roll away from the vehicle 102 and allow items to be replenished or removed more easily. The storage pod control devices 124 may be commanded by the distribution service module 126 to control the mobility platform 602 of an individual one of the storage pods 108 and cause that storage pod to move from the vehicle 102, or cause that storage pod to move towards the vehicle 102 to be reattached to the vehicle 102. In at least one example, the storage pod control devices 124 command a plurality of the storage pods 108 at the same time (e.g., the storage pods 108 may be commanded to detach or reattach from the vehicle 102 in an autonomous way and/or in a specific order) as determined by the control commands sent to the mobility platform 602 of each of the storage pods 108 that are being controlled.

The storage pods 108 include various different compartments for containing items for various purposes, or for providing various types of services. For example, one or more of the storage pods 108 on the vehicle 102 contain medical items (e.g., bandages, medicine), and another of the storage pods 108 is configured to hold groceries (e.g., food, snacks, beverages). In at least one example, one or more of the storage pods 108 have shelves, drawers, or other types of compartments for containing perishable items (e.g., flowers), another of the storage pods 108 has a compartment for non-perishable items (e.g., clothing, shoes, tools, materials, supplies), and another of the storage pods 108 has a compartment for inbound and outbound postal items or packages.

In one example, the vehicle includes a waste disposal compartment that replaces a traditional garbage and/or recycle bin picked up by a garbage truck. For example, at least one item in the inventory of the vehicle 102 includes garbage, trash, waste, or recyclables. When not likely to inconvenient the user 106, the vehicle 102 may automatically take refuse placed in the storage pods 108 to a waste processing center or a waste disposal center when that storage pod is full. This may eliminate litter falling out of overfilled bins place on the curb (e.g., after a party, after a gathering, after a holiday celebration).

The possible types of compartments are numerous. As another example, the user 106 is performing home improvement tasks, and rather than have specialized tools on hand in their garage, the vehicle 102 can stock the tools, materials, and equipment needed to complete the job in one of the storage pods 108. The vehicle 102 can automatically return to the home improvement store to retrieve additional items that the user 106 forgot to order ahead of time. The storage pods 108 with the tools and materials may be left behind at the host site 104 and additional tools and materials are loaded into other available storage pods that are still attached to the vehicle 102, thus the user 106 avoids wasting time stopping and starting their work and having to drive to the store.

As another example, imagine the vehicle 102 includes a toolbox compartment stocked with various hand tools, power tools, and other supplies. Imagine the user 106 needs to service their car and through interactions with the vehicle UI or external device, the user 106 indicates to the vehicle 102 the type of service they plan to perform. The user 106 inputs the task to the vehicle 102 by speaking to a microphone of the sensor devices 120 "I want to service my car in the morning" and when the user 106 awakes, the distribution service module 126 has caused the vehicle 102 to fill the toolbox compartment with the correct oil filter wrench, the oil filter, the oil, some instructions, etc. for servicing their particular vehicle.

In one or more examples, the storage pods 108 include self-contained a robotic vacuum positioned on the mobility platform 602. The distribution service module 126 may cause the robotic vacuum to automatically detach from the vehicle 102, cleans an area at the host site 104, and return to the vehicle 102 to be emptied when the vehicle 102 goes on an errand.

At least one of the storage pods 108 is configured to dispense medicine or other controlled substances (e.g., alcohol, tobacco) from the inventory on the vehicle 102, in at least one example. For example, the medical storage pod stores medicine that is securely dispensed from the vehicle 102 for consumption of the user 106. Imagine the user 106 has a prescription medication needing to be refilled. Rather than go to a pharmacy, the user 106 can walk to their garage at the host site 104 and the vehicle 102 has a locked/secured medicine dispensary system within one of the storage pods 108, which after authenticating the user 106, dispenses the prescription. In one or more implementations, the vehicle 102 automatically transacts with a pharmacy, health provider, or other platform to ensure the correct medicine is provided to the correct person (e.g., via online exchange with a medical provider, health insurance provider, local pharmacist), and then dispenses the prescription refill right there, at the host site 104.

In at least one implementation, the storage pods 108 include a compartment on the vehicle 102 that is configured as a power source (e.g., generator, battery) to supply extra electric power to the storage pods 108 (e.g., refrigerator compartments), the vehicle 102 (e.g., the vehicle system 110, the vehicle system 200), or power equipment at the host site 104 (e.g., during a power outage). For example, the electrical power from the storage pods 108 is used to charge other vehicles at the host site 104, power their home, or enable other tasks of the user 106.

An electrical connection point 604 is depicted on the vehicle 102 to illustrate how the vehicle 102 may output power from the storage pods 108 or receive input power to the storage pods 108, including to charge or recharge other electrical systems (e.g., the battery management subsystem on the vehicle 102, the subsystem 202-9, the host site 104). For example, the vehicle 102 uses the electrical connection point 604 to plug into a wall outlet at the host site 104 or another power source at the host site 104 (e.g., another vehicle) for charging the vehicle 102, providing power to the host site 104, or powering the storage pods 108 (e.g., refrigeration devices) to implement the vehicle hosted distribution service.

Figure 7:
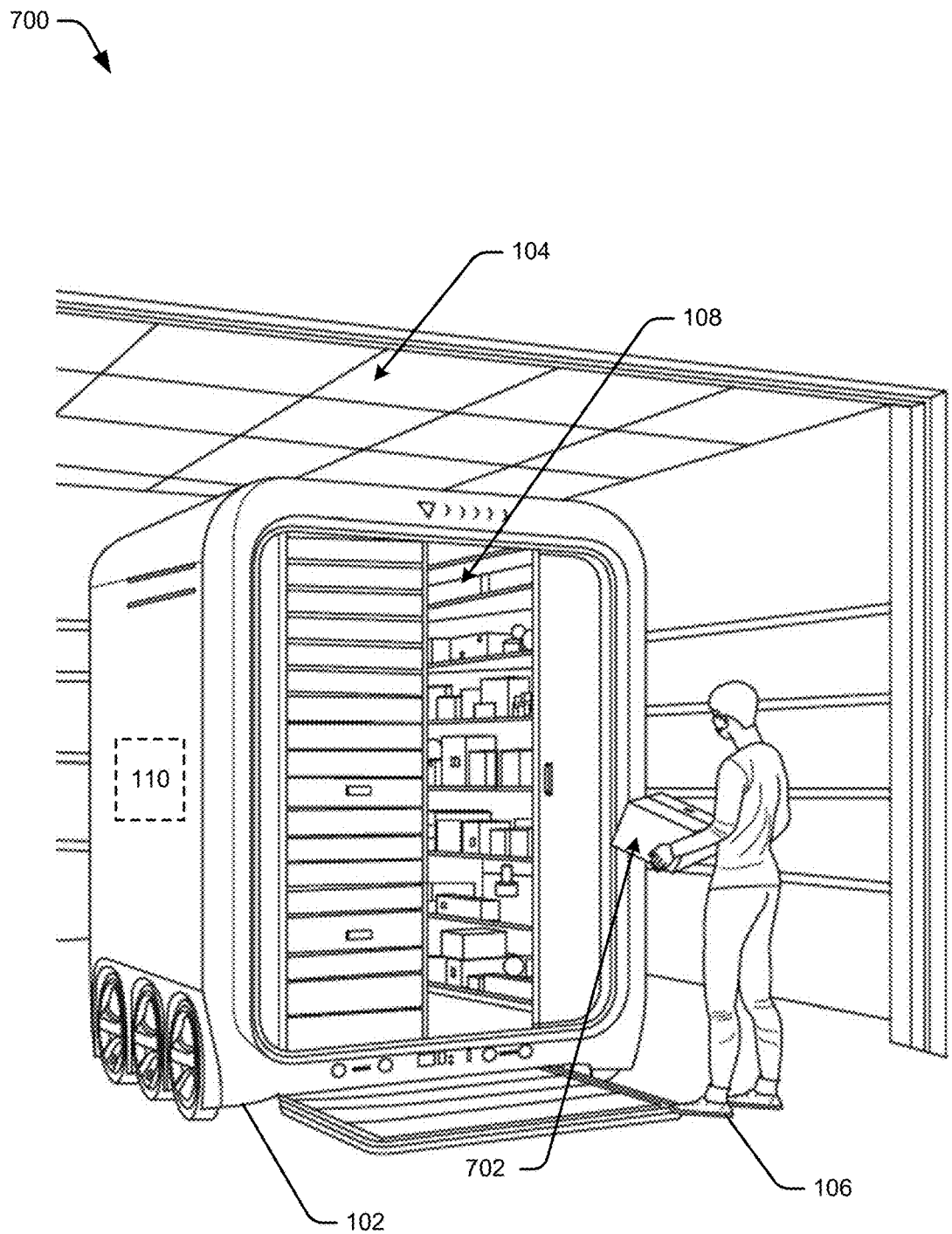
FIG. 7 depicts a non-limiting example scenario of an autonomous vehicle hosted distribution service.

FIG. 7 depicts a non-limiting example scenario 700 of an autonomous vehicle hosted distribution service. For ease of description, the scenario 700 is described in the context of the environment 100 shown in FIG. 1 including with reference to similar labeled elements. For example, the scenario 700 depicts the host site 104 with the user 106 standing next to the vehicle 102 with a package 702 in their hands to be added to an inventory of items maintained in the storage pods 108. The package 702 can be any item. In the context of logistics tasks, examples of the package 702 include a package, a letter, and an envelope.

The scenario 700 illustrates how the distribution service module 126 causes the vehicle 102 to perform logistical tasks. For example, the distribution service module 126 manages inbound and outbound logistical tasks performed by the vehicle 102. Beyond running errands to retrieve items to keep at the host site 104 for user convenience, the distribution service module 126 may cause the vehicle 102 to deliver packages and mail from the host site 104 to other locations in a neighborhood. For packages and mail that are outside a vehicle range, the distribution service module 126 causes the vehicle 102 to transport the deliverables to a private or public shipment distribution center (e.g., a government post office, a private parcel service location). For home businesses, small businesses, etc., the vehicle can also facilitate peer-to-peer transactions. For example, an item from a seller is posted to an auction site and rather than have that person come to the business (e.g., the host site 104) to pick up the item, the vehicle 102 automatically delivers the purchased items on behalf of the business.

Consider an example where the user 106 approaches the vehicle 102 with the package 702, which represent an outbound delivery. After detecting and authenticating the user 106 based on the sensor data generated by the sensor devices 120, the distribution service module 126 causes the storage pods 108 to open their doors or otherwise provide access to the shelves and bins for storing items on the vehicle 102. Then, responsive to detecting the user 106 loading at least one item to the vehicle 102 (e.g., the package 702), the distribution service module 126 updates the inventory data store 128 to reflect the inventory change to include the package 702. The distribution service module 126 controls the vehicle 102 to leave the host site 104 and drive to a delivery location (e.g., a private or public shipment distribution center) for the package 702 loaded on the vehicle 102 and included in information maintained by the inventory data store 128. At the delivery location, the package 702 is removed from the storage pods 108. Then, responsive to updating the inventory to omit the package 702 from the inventory, the distribution service module 126 controls the vehicle 102 to return to the host site 104 having delivered the package 702 at the delivery location.

In one or more examples, the logistical tasks performed by the vehicle 102 are time sensitive (e.g., a friend needs to borrow something to help finish a current task) and the vehicle 102 makes the delivery immediately. For example, the distribution service module 126 determines whether the at least one item (e.g., the package 702) loaded on the vehicle 102 is a time-sensitive delivery based on sensor data (e.g., image recognition of identifying markings on the item), based on user inputs (e.g., the user 106 talks to the vehicle 102 to say that the package 702 has a specific delivery window), or other information (e.g., the distribution service module 126 has access to the small business computer systems to automatically determine which orders are time sensitive and not). When the at least one item loaded on the vehicle 102 is a time-sensitive delivery, the distribution service module 126 controls the vehicle 102 to immediately (or with sufficient urgency to satisfy the delivery window) leave the host site 104 and drive to the delivery location. Other logistical tasks that are not time sensitive can be performed when not likely to inconvenience the user 106 from the vehicle 102 being absent from the host site 104. For example, when the at least one item loaded on the vehicle 102 determined by the distribution service module 126 to not be a time-sensitive delivery, the vehicle 102 is controlled to leave the host site 104 and drive to the delivery location during a time of day when an absence of the vehicle 102 from the host site 104 does not inconvenience the user 106 (e.g., the vehicle 102 delivers the package 702 over night by rendezvousing with another autonomous vehicle that takes the package 702 to the delivery location).

Consider another example where the user 106 expects the vehicle 102 to deliver the package 702 to the host site 104, which represent an inbound delivery. The vehicle 102 may already be at a private or public shipment distribution center to drop off outbound deliveries to be shipped out when the package 702 is loaded on the vehicle 102 for delivery to the user 106 at the host site 104. Responsive to the distribution service module 126 detecting an inbound shipment being loaded on the vehicle 102 at the private or public shipment distribution center, the inventory data store 128 is updated to include an identifier of the package 702 as the inbound shipment. Responsive to updating the inventory to include the inbound shipment in the inventory, the distribution service module 126 controls the vehicle 102 to return to the host site 104 (e.g., having delivered the outbound shipment at the private or public shipment distribution center). Responsive to detecting the user 106 approaching the vehicle 102, the distribution service module 126 authenticates the identity of the user 106 for authorizing access to the inbound shipment (e.g., the package 702). Then, responsive to detecting the user 106 removing the inbound shipment (e.g., the package 702) from the vehicle 102 based on sensor data obtained from the sensor devices 120, the distribution service module 126 causes the processors 118 to write to memory of the vehicle 102 and update the inventory data store 128 to omit the inbound shipment from the inventory of the vehicle 102.

Figure 8:
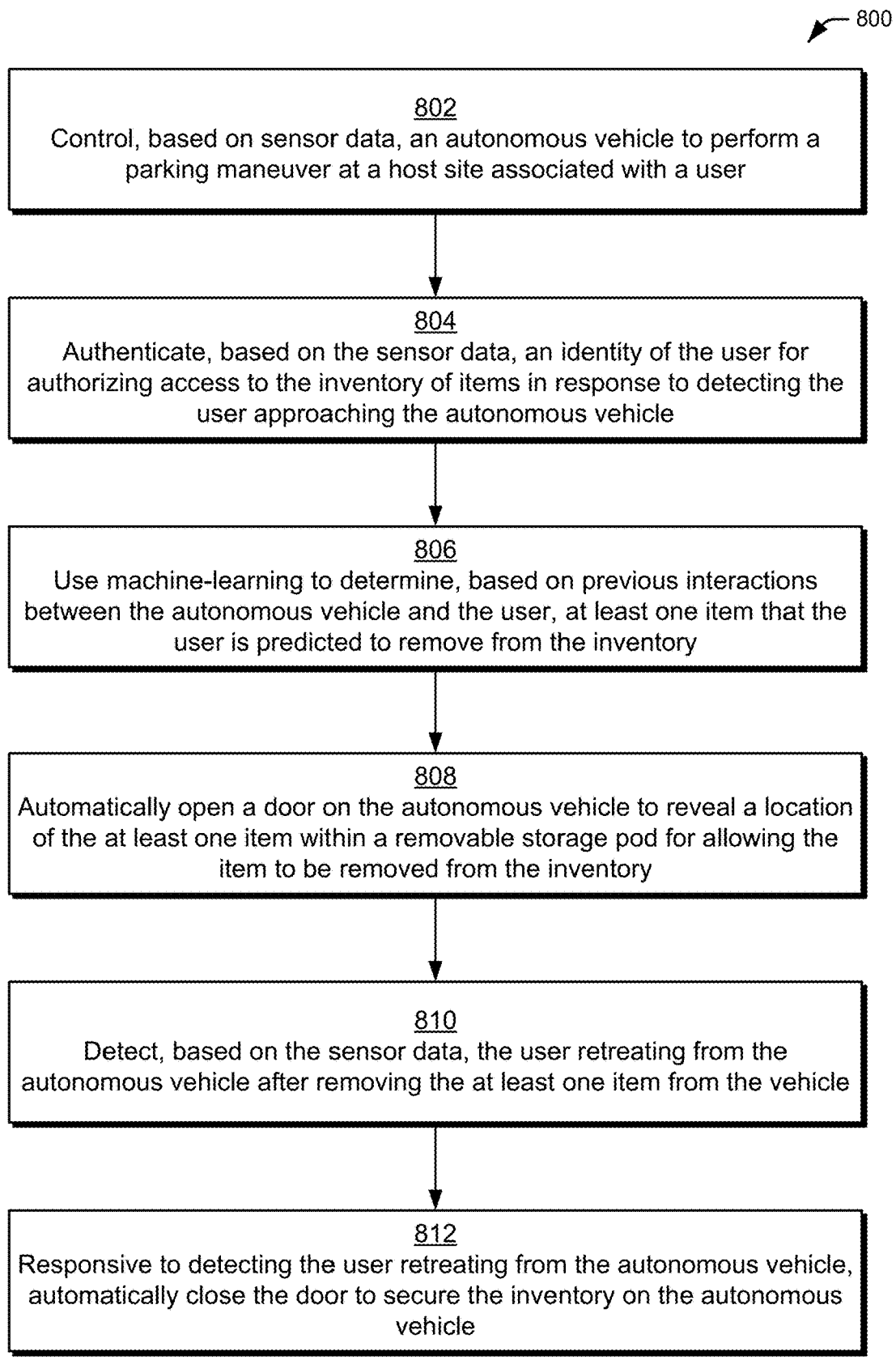
FIG. 8 depicts a procedure implemented by an autonomous vehicle hosted distribution service.

FIG. 8 depicts a procedure 800 implemented by an autonomous vehicle hosted distribution service. The procedure 800 includes multiple operations illustrated as block 802 through block 812 and provides just one example procedure performed within any of the previously described systems (e.g., the vehicle system 110, the vehicle system 200, the fleet service system 300). The procedure 800 is not limited to the order of operations shown in FIG. 8, other orderings of the block 802 through the block 812 are possible. In one or more implementations, the procedure 800 includes additional or fewer operations than those depicted in FIG. 8.

The procedure 800 starts with controlling, based on sensor data, an autonomous vehicle to perform a parking maneuver at a host site associated with a user (block 802). For example, the distribution service module 126 interfaces with the control system 204 to drive the vehicle 102 to the host site 104 and park in a lot, a spot, a garage, a carport, or other location that is convenient to the user 106.

Next, the procedure 800 includes authenticating, based on the sensor data, an identity of the user for authorizing access to the inventory of items in response to detecting the user approaching the autonomous vehicle (block 804). For example, the distribution service module 126 receives sensor data from the sensor devices 120 and tracks objects appearing in a vicinity of the vehicle 102. In response to detecting a face of the user 106, the distribution service module 126 automatically authenticates the user 106 as being authorized to access items contained in the inventory of the vehicle 102.

The procedure 800 continues with machine-learning being used to determine, based on previous interactions between the autonomous vehicle and the user, at least one item that the user is predicted to remove from the inventory (block 806). For example, the distribution service module 126 executes a machine-learned model that predicts items the user 106 is likely to consume at the host site 104. The machine-learned model may be trained or retrained from contextual information about the environment 100 (e.g., weather, calendar, time) and from user information about the user 106 (e.g., an online presence, social media posts, shopping histories, browsing histories). The machine-learned model, when trained, infers what items the user 106 is likely to need when at the host site 104.

As used herein, the term "machine-learning model" refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

The procedure 800 continues with a door on the autonomous vehicle being automatically opened to reveal a location of the at least one item within a removable storage pod for allowing the item to be removed from the inventory (block 808). For example, the distribution service module 126 commands the storage pod control devices 124 to control actuators on the storage pods 108 for unlocking and opening access panels or doors that reveal items contained therein. In some examples, lighting systems within the storage pods 108 are activated when the door is open to illuminate the items and make them easier to view from the environment 100.

Next in the procedure 800, the user is detected, based on the sensor data, retreating from the autonomous vehicle after removing the at least one item from the vehicle. For example, the user 106 reaches into an open compartment of the storage pods 108 to obtain tools or materials for completing a home renovation project at the host site 104. With possession of their items, the user 106 immediately leaves a vicinity of the vehicle 102 with the tools and materials in hand to finish their task. The sensor data generated by the sensor devices 120 tracks the user 106 walking away from the vehicle 102 and the distribution service module 126 determines that an interaction between the user 106 and the vehicle 102 is concluded.

Lastly, responsive to detecting the user retreating from the autonomous vehicle, the procedure 800 includes automatically closing the door to secure the inventory on the autonomous vehicle. For example, the distribution service module 126 commands the storage pod control devices 124 to control the actuators on the storage pods 108 for closing and locking access panels or doors that were previously opened to secure the inventory on the vehicle 102. In some examples, lighting systems within the storage pods 108 are deactivated when the door is closed, and one or more other vehicle subsystems are deactivated to conserve electrical energy.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the distribution service module 126, the inventory data store 128, the distribution resources 116) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a DSP, a GPU, a parallel accelerated processor, a plurality of microprocessors, one or more microprocessors in association with a DSP core, a controller, a microcontroller, Application Specific Integrated Circuits (ASICs), FPGAs, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a ROM, a RAM, a register, cache memory, semiconductor memory devices, magnetic media such as internal hard disks and removable disks, magneto-optical media, and optical media such as CD-ROM disks, and digital versatile disks (DVDs).

What is claimed is:

1. A method for implementing a vehicle hosted distribution service, the method comprising:
controlling, by a processing device, an autonomous vehicle to perform a parking maneuver at a host site associated with a user;
responsive to detecting the user approaching the autonomous vehicle, authenticating, by the processing device, an identity of the user for authorizing access to an inventory of items loaded on the vehicle;
responsive to detecting the user removing at least one item from the vehicle, updating, by the processing device, the inventory to omit the at least one item;
controlling, by the processing device, the autonomous vehicle to leave the host site and drive to a distribution center for replenishing the inventory with a second instance of the at least one item removed from the vehicle and omitted from the inventory; and
responsive to updating the inventory to include the second instance of the at least one item, controlling, by the processing device, the autonomous vehicle to return to the host site with the second instance of the at least one item included in the inventory.

2. The method of claim 1, wherein the inventory of items are loaded in one or more storage pods on the vehicle, the method further comprising:
responsive to authenticating the identity of the user, controlling, by the processing device, an access panel into the storage pods to open and provide the access to the inventory of items loaded on the vehicle.

3. The method of claim 2, further comprising:
responsive to detecting the user retreating from the autonomous vehicle, controlling, by the processing device, the access panel to close and secure the inventory of items loaded on the vehicle.

4. The method of claim 1, wherein the user comprises a first user, the method further comprising:
responsive to detecting a second user approaching the autonomous vehicle, refraining, by the processing device, from authorizing access to the inventory of items when the processing device fails to authenticate an identity of the second user.

5. The method of claim 1, wherein controlling the autonomous vehicle to leave the host site and drive to the distribution center comprises:
determining, by the processing device, a time of day when an absence of the vehicle from the host site does not inconvenience the user,
wherein controlling the autonomous vehicle to leave the host site and drive to the distribution center occurs during the time of day when the absence of the vehicle from the host site does not inconvenience the user.

6. The method of claim 1, further comprising:
further responsive to detecting the user removing the at least one item from the vehicle, executing, by the processing device, a commercial transaction to purchase the at least one item on behalf of the user.

7. The method of claim 1, wherein the inventory of items loaded on the vehicle comprise at least one of medicine, medical supplies, or medical equipment, the method further comprising:
receiving, by the processing device, an alert from an emergency response service requesting the medicine, the medical supplies, or the medical equipment to be delivered to an emergency location; and controlling, by the processing device, the autonomous vehicle to leave the host site and drive to the emergency location for delivering the medicine, the medical supplies, or the medical equipment in response to the alert.

8. A system comprising:
one or more sensor devices configured to generate sensor data indicative of an environment inside or outside an autonomous vehicle;
one or more removable storage pods configured to store an inventory of items loaded on the autonomous vehicle; and
at least one processing device configured to:
control, based on the sensor data, the autonomous vehicle to perform a parking maneuver at a host site associated with a user;
authenticate, based on the sensor data, an identity of the user for authorizing access to the inventory of items in response to detecting the user approaching the autonomous vehicle;
use machine-learning to determine, based on previous interactions between the autonomous vehicle and the user, at least one item that the user is predicted to remove from the inventory;
automatically open a door on the autonomous vehicle to reveal a location of the at least one item within the removable storage pods for allowing the item to be removed from the inventory;
detect, based on the sensor data, the user retreating from the autonomous vehicle after removing the at least one item from the vehicle; and
responsive to detecting the user retreating from the autonomous vehicle, automatically close the door to secure the inventory on the autonomous vehicle.

9. The system of claim 8, wherein the at least one processing device is further configured to:
control the autonomous vehicle to leave the host site and drive to a remote location for replenishing the inventory with a second instance of the at least one item removed from the vehicle;
control the autonomous vehicle to obtain the second instance of the at least one item from a removable storage pod of another autonomous vehicle parked at the remote location; and
responsive to updating the inventory to include the second instance of the at least one item, control the autonomous vehicle to return to the host site with the second instance of the at least one item included in the inventory.

10. The system of claim 8, wherein the at least one processing device is further configured to:
use machine-learning to determine, based on an online presence of the user, one or more other items that the user is predicted to use at the host site;
control the autonomous vehicle to leave the host site and drive to a distribution center for adding the one or more other items to the inventory; and
responsive to updating the inventory to include the one or more other items, control the autonomous vehicle to return to the host site with the one or more other items.

11. The system of claim 8, further comprising:
one or more output devices configured to produce audible, visual, or haptic signals of a user interface to indicate a menu of the inventory of items loaded on the autonomous vehicle and other inventories of items loaded on other autonomous vehicles parked in a vicinity of the host site.

12. The system of claim 8, wherein:
at least one of the removable storage pods is configured to dispense medicine from the inventory; and
the at least one item comprises the medicine.

13. The system of claim 8, wherein:
the user is a first user;
the host site comprises a first residence of the first user and a second residence of a second user;
a first subset of the removable storage pods comprise a first subset of the inventory including a first subset of the items reserved for the first user; and
a different subset of the removable storage pods comprise a different subset of the inventory including a different subset of the items reserved for the second user.

14. A computer-readable storage medium comprising instructions that, when executed, cause at least one processing device to:
control an autonomous vehicle to perform a parking maneuver at a host site associated with a user;
responsive to detecting the user approaching the autonomous vehicle, authenticate an identity of the user for authorizing access to an inventory of items loaded on the vehicle;
responsive to detecting the user loading at least one item to the vehicle, update the inventory to include the at least one item;
control the autonomous vehicle to leave the host site and drive to a delivery location for the at least one item loaded on the vehicle and included in the inventory; and
responsive to updating the inventory to omit the at least one item from the inventory, control the autonomous vehicle to return to the host site having delivered the at least one item at the delivery location.

15. The computer-readable storage medium of claim 14, wherein the at least one item comprises at least one of a package, a letter, or an envelope, and the delivery location comprises a private or public shipment distribution center.

16. The computer-readable storage medium of claim 15, wherein the instructions further cause the at least one processing device to:
determine whether the at least one item loaded on the vehicle is a time-sensitive delivery;
when the at least one item loaded on the vehicle is a time-sensitive delivery, control the autonomous vehicle to immediately leave the host site and drive to the delivery location; and
when the at least one item loaded on the vehicle is not a time-sensitive delivery, control the autonomous vehicle to leave the host site and drive to the delivery location during a time of day when an absence of the vehicle from the host site does not inconvenience the user.

17. The computer-readable storage medium of claim 15, wherein the at least one item comprises an outbound shipment, and the instructions further cause the at least one processing device to:
responsive to detecting an inbound shipment being loaded on the vehicle at the private or public shipment distribution center, update the inventory to include the inbound shipment;
responsive to updating the inventory to include the inbound shipment to the inventory, control the autonomous vehicle to return to the host site having delivered the outbound shipment at the private or public shipment distribution center;

responsive to detecting the user approaching the autonomous vehicle, authenticate the identity of the user for authorizing access to the inbound shipment; and responsive to detecting the user removing the inbound shipment from the vehicle, update the inventory to omit the inbound shipment.

18. The computer-readable storage medium of claim 14, wherein the at least one item comprises at least one of trash, waste, or recyclables, and the delivery location comprises a waste processing center.

19. The computer-readable storage medium of claim 14, wherein the computer-readable storage medium is installed in the autonomous vehicle.

20. The computer-readable storage medium of claim 14, wherein the computer-readable storage medium is installed in a remote computing system communicatively coupled to the autonomous vehicle.

* * * * *